United States Patent
Obata et al.

(10) Patent No.: US 7,350,220 B2
(45) Date of Patent: Mar. 25, 2008

(54) DISK DRIVE UNIT

(75) Inventors: Manabu Obata, Kanagawa (JP);
Zensaku Mitsuji, Kanagawa (JP);
Morihiro Murata, Saitama (JP);
Hisashi Negoro, Chiba (JP); Yusuke Hirano, Chiba (JP)

(73) Assignee: Sony Corporation, Tokyo (JP)

( * ) Notice: Subject to any disclaimer, the term of this patent is extended or adjusted under 35 U.S.C. 154(b) by 542 days.

(21) Appl. No.: 10/819,804

(22) Filed: Apr. 7, 2004

(65) Prior Publication Data

US 2004/0255311 A1    Dec. 16, 2004

(30) Foreign Application Priority Data

Apr. 9, 2003    (JP)    ............... 2003-104839

(51) Int. Cl.
*G11B 7/00*    (2006.01)
*G11B 7/85*    (2006.01)

(52) U.S. Cl. .............. 720/671; 720/648; 720/601

(58) Field of Classification Search ............ 720/614, 720/615, 616, 669, 670, 671, 601, 648; G11B 33/02
See application file for complete search history.

(56) References Cited

U.S. PATENT DOCUMENTS

| | | | |
|---|---|---|---|
| 5,675,566 A * | 10/1997 | Kosaka et al. ............. 720/631 |
| 5,677,904 A * | 10/1997 | Yokota et al. ............. 720/669 |
| 5,790,511 A | 8/1998 | Juso et al. |
| 6,185,180 B1 | 2/2001 | Morishita |
| 6,430,143 B1 | 8/2002 | Kajiyama et al. |
| 6,964,056 B2 * | 11/2005 | Obata et al. ............. 720/616 |
| 7,137,129 B2 * | 11/2006 | Obata et al. ............. 720/604 |
| 7,188,349 B2 * | 3/2007 | Ezawa et al. ............. 720/669 |
| 2002/0021648 A1 * | 2/2002 | Shiomi et al. ............. 369/75.2 |
| 2004/0066712 A1 * | 4/2004 | Mitsumoto et al. ...... 369/30.36 |
| 2004/0213152 A1 * | 10/2004 | Matuoka et al. ............ 370/230 |
| 2004/0255310 A1 | 12/2004 | Obata et al. |

FOREIGN PATENT DOCUMENTS

| | | |
|---|---|---|
| EP | 1434220 | 6/2004 |
| EP | 1435615 | 7/2004 |
| JP | 06/005062 | 1/1994 |
| JP | 06/274917 | 9/1994 |
| JP | 08007430 A * | 1/1996 |
| JP | 2003/100004 | 4/2003 |
| JP | 2003/100007 | 4/2003 |

* cited by examiner

*Primary Examiner*—Brian E. Miller
*Assistant Examiner*—Matthew G. Kayrish
(74) *Attorney, Agent, or Firm*—Oblon, Spivak, McClelland, Maier & Neustadt, P.C.

(57) ABSTRACT

A disk drive unit advantageously prevents dust from adhering to a pickup. The disk drive unit has a housing and a tray. The tray reciprocates between a retracted position and a projected position. A first pickup and a second pickup have a spindle motor located therebetween. The tray has a first cutout and a second cutout. A cover is provided to cover the top of the second pickup in its retreated position. The cover has a cover piece, which is disposed in a front portion of the cover that is positioned on the upstream side relative to the rotational direction of a disk-shaped recording medium such that it is movable in a direction parallel to the direction in which the second pickup moves, and urged in the projecting direction.

7 Claims, 22 Drawing Sheets

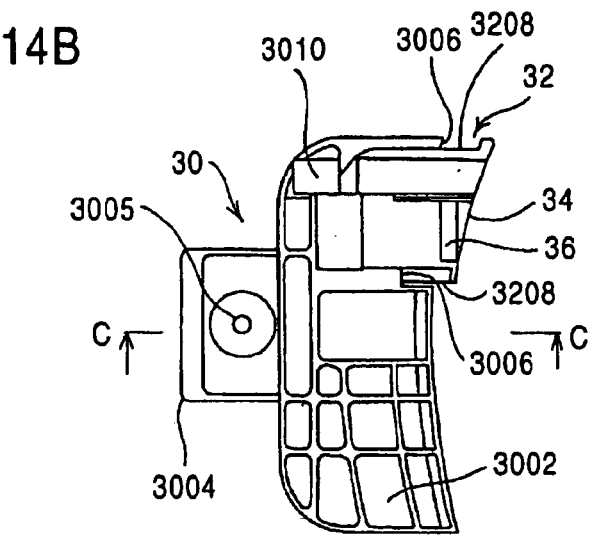
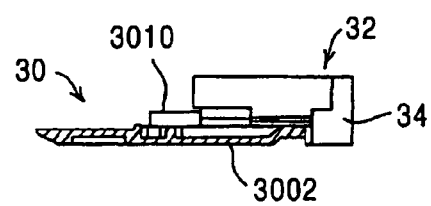
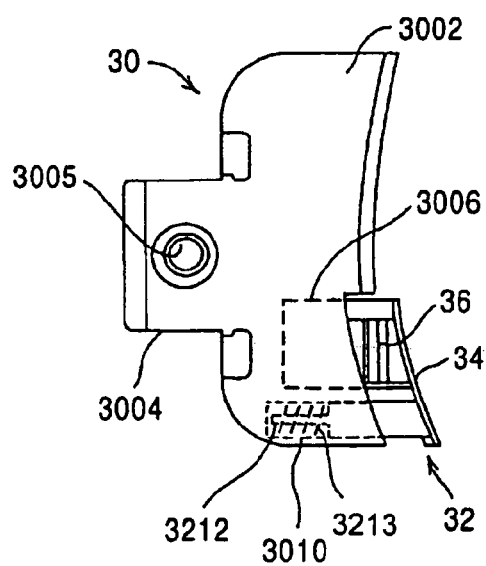

FIG. 15D
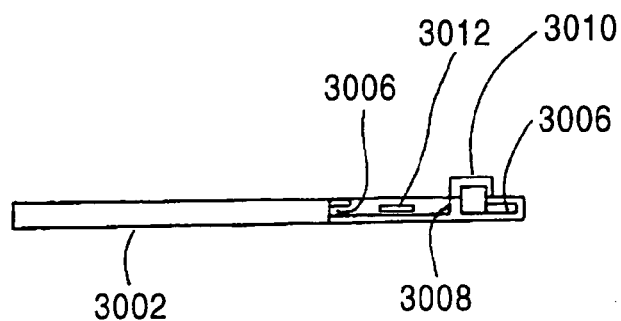
FIG. 15A
FIG. 15B 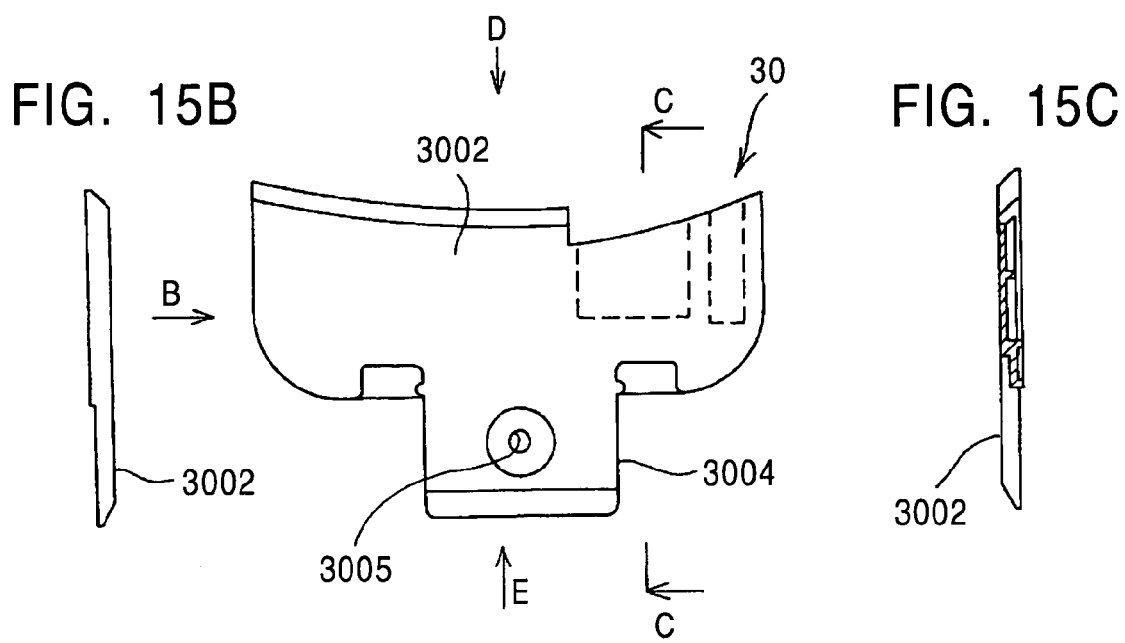 FIG. 15C
FIG. 15E
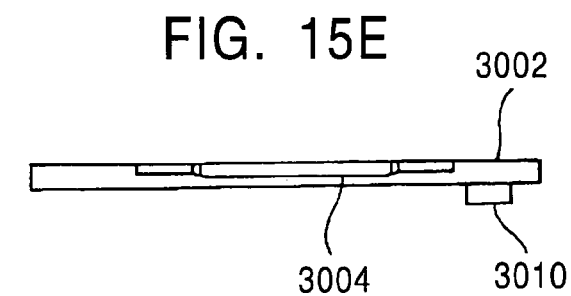

DISK DRIVE UNIT

BACKGROUND OF THE INVENTION

1. Field of the Invention

The present invention relates to a disk drive unit adapted to record and/or reproduce information in and/or from a disk-shaped recording medium.

2. Description of the Related Art

There have been provided disk drive units for recording and reproducing information in and from optical disks, such as CDs and DVDs, and also DVRs or blue ray disks for recording information with higher densities than those of the CDs and DVDs (refer to, for example, Japanese Unexamined Patent Application Publication No. 2003-67920).

The wavelength of an optical beam used for recording and reproducing in and from CDs and DVDs is, for example, 650 nm or 680 nm, while the wavelength of an optical beam used for recording and reproducing in and from DVRs is shorter, e.g., 405 nm. For this reason, the aforesaid disk drive unit is equipped with a first pickup having a light source of the wavelength of the CDs and DVDs, and a second pickup having a light source of the wavelength for the DVRs.

Because of the difference in wavelength mentioned above, the sizes of light spots formed on a DVR are significantly smaller than those formed on a CD or DVD, so that DVRs are more susceptible to dust than CDs or DVDs are.

A DVR is, hence, provided in the form of a disk cartridge having an optical disk housed in a cartridge case to protect the optical disk from dust.

However, in the disk drive unit described above, dust on a CD or DVD, or dust on the disk cartridge of a DVR inevitably is scattered in the disk drive unit.

If dust adheres to an object lens of the second pickup, then the quantity of light reaching an optical disk reduces, and recording or reproducing failure may result, or excessive drive current may be supplied to the light source of the second pickup to compensate for the reduced quantity of light, causing deterioration of the light source.

SUMMARY OF THE INVENTION

The present invention has been made with a view toward solving the problems described above, and it is an object of the invention to provide a disk drive unit that advantageously protects pickups from dust.

To this end, the present invention provides a disk drive unit including a housing, a tray on which a disk-shaped recording medium or a disk cartridge accommodating a disk-shaped recording medium is mounted, and which travels between a retracted position where it is drawn into the housing to perform recording or reproduction and an ejected position where it is drawn out of the housing to load or unload a disk-shaped recording medium or a disk cartridge, a pickup which is provided in the housing and travels between a retreated position away from the disk-shaped recording medium at the tray retracted position and a recording/reproducing position which faces the bottom surface of the disk-shaped recording medium at the tray retracted position and where information is recorded and/or reproduced in and/or from the disk-shaped recording medium, and a rotative driving means for rotating the disk-shaped recording medium when recording and/or reproducing the information, wherein the tray comprises a cutout provided in the bottom surface of the tray such that it extends along a travel track of the pickup from the center of the disk-shaped recording medium accommodated in the tray, the cutout being provided for recording and/or reproducing information in and/or from the disk-shaped recording medium, and a cover that covers a portion of the cutout on the outer side in the radial direction of the disk-shaped recording medium accommodated in the tray, and covers the top of the pickup at the retreated position while the tray is at the retracted position.

With this arrangement, even if dust on a disk cartridge or a tray is scattered in a housing, the cover provided over the pickup in the retreated position prevents the dust scattered toward the pickup from adhering to the pickup.

BRIEF DESCRIPTION OF THE DRAWINGS

FIG. 14A is an assembly diagram of the cover, FIG. 14B is a bottom view of the cover shown in FIG. 14A, and FIG. 14C is a sectional view taken at line C-C shown in FIG. 14B;

FIG. 15A is a plan view of the cover, FIG. 15B is a fragmentary view taken in the direction of arrow B shown in FIG. 15A, FIG. 15C is a sectional view taken at line C-C shown in FIG. 15A, FIG. 15D is a fragmentary view taken in the direction of arrow D shown in FIG. 15A, and FIG. 15E is a fragmentary view taken in the direction of arrow E shown in FIG. 15A;

DESCRIPTION OF THE PREFERRED EMBODIMENTS

A disk drive unit according to an embodiment of the present invention will now be described in conjunction with the accompanying drawings.

Figure 1:
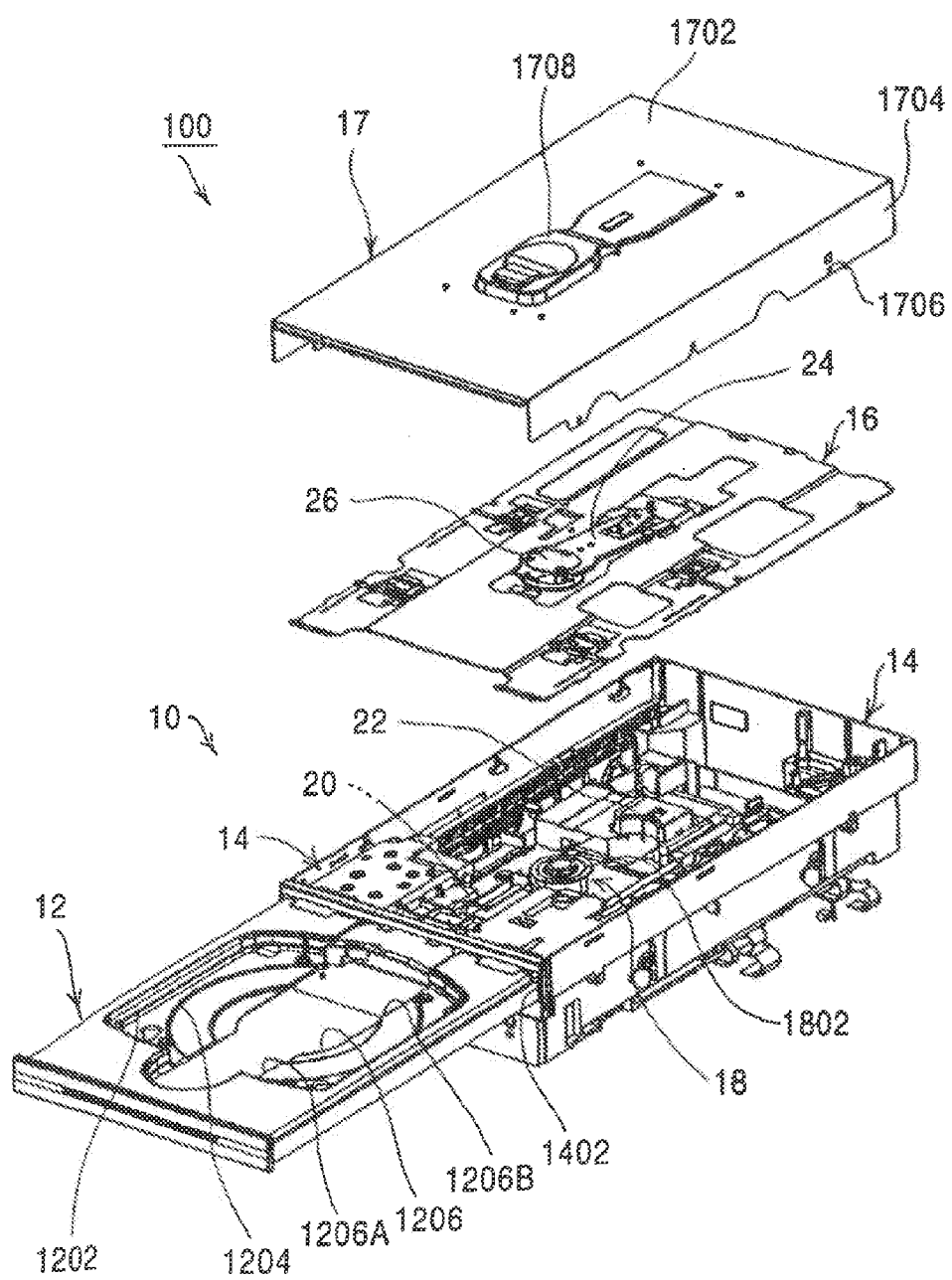
FIG. 1 is an exploded perspective view of a disk drive unit according to an embodiment of the present invention.
Figure 2:
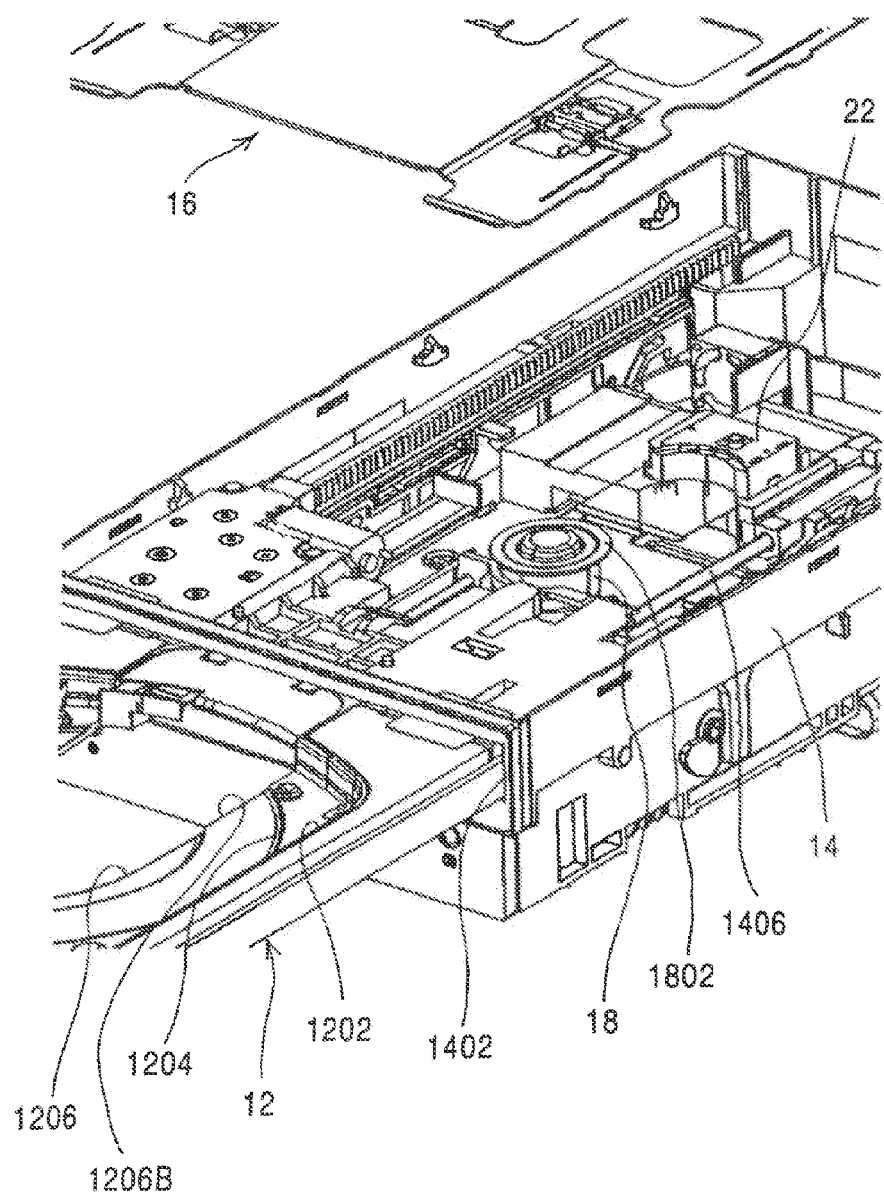
FIG. 2 is a partial perspective view of a main body of the disk drive unit.
Figure 3:
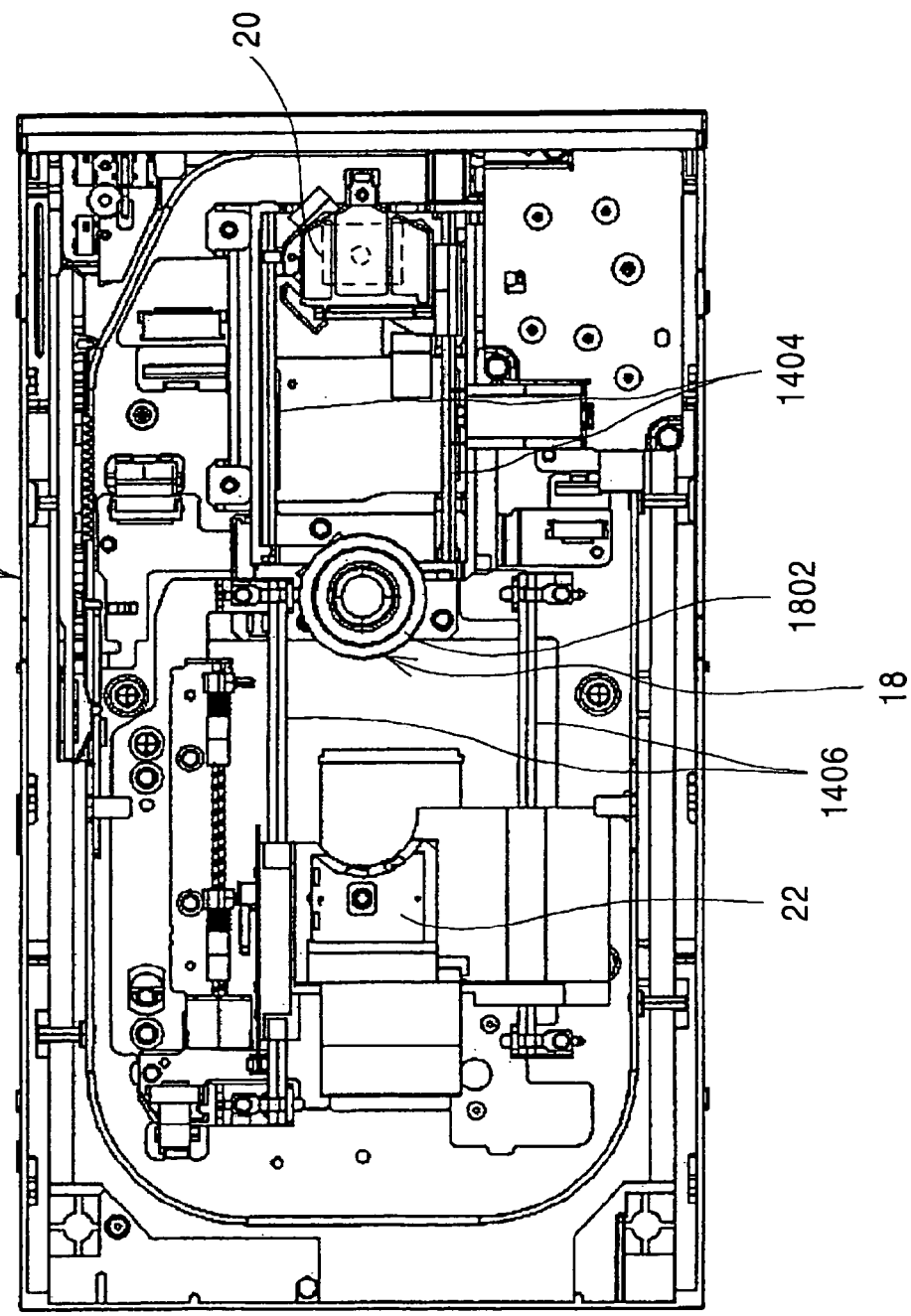
FIG. 3 is a plan view of the main body.
Figure 4:
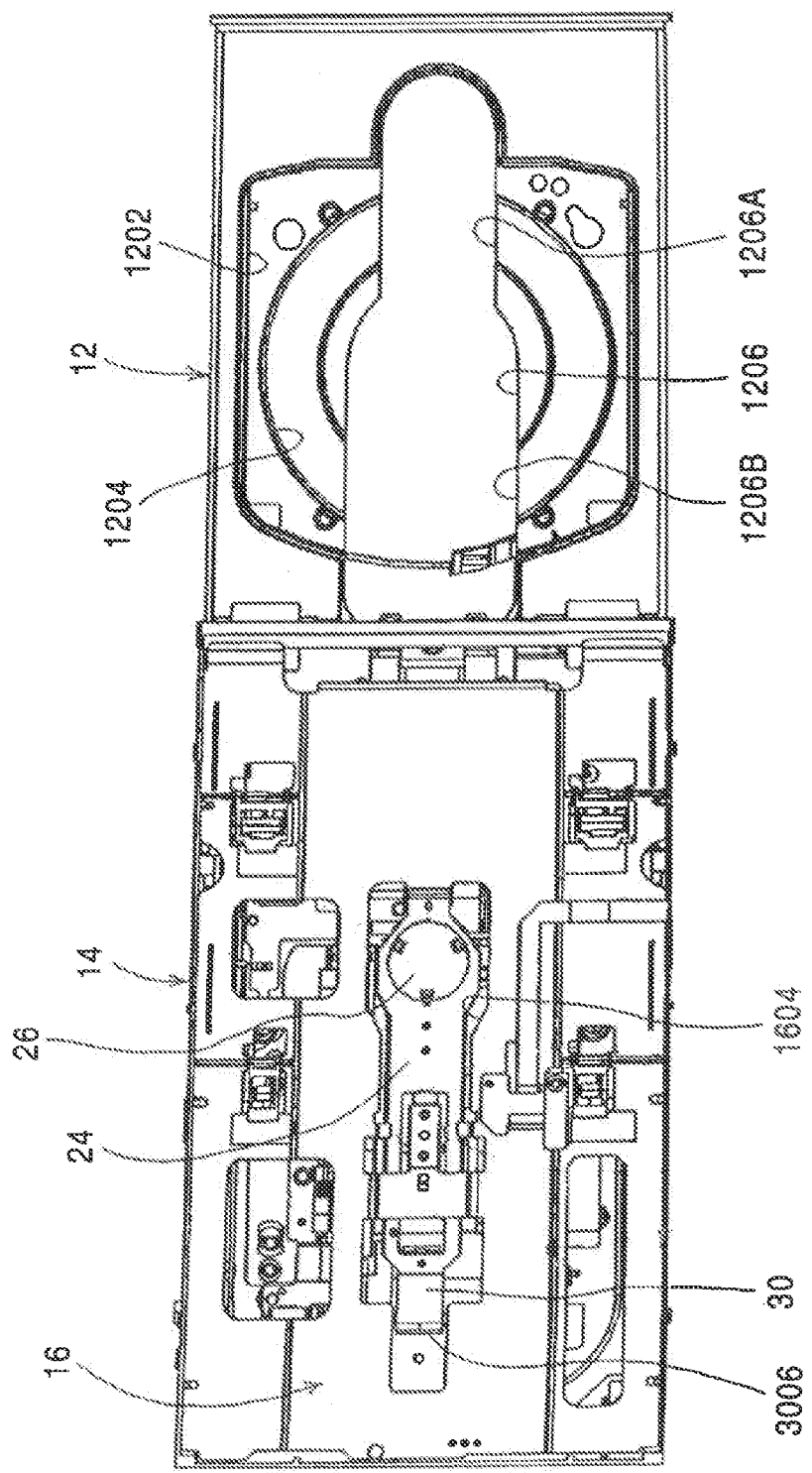
FIG. 4 is a plan view showing a state wherein a tray is in an ejected position.
Figure 5:
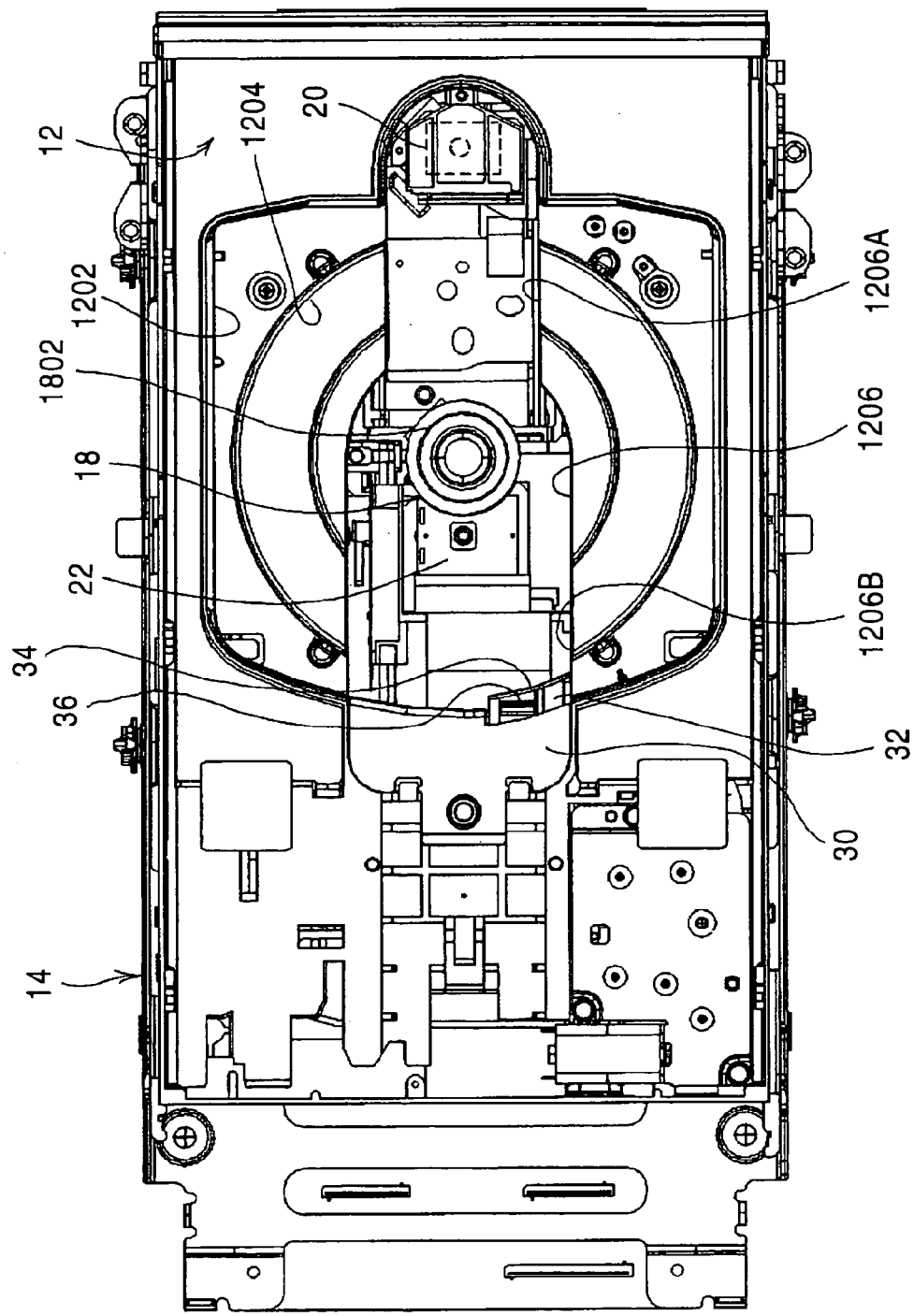
FIG. 5 is a plan view showing a state wherein the tray is in the retracted position.
Figure 6:
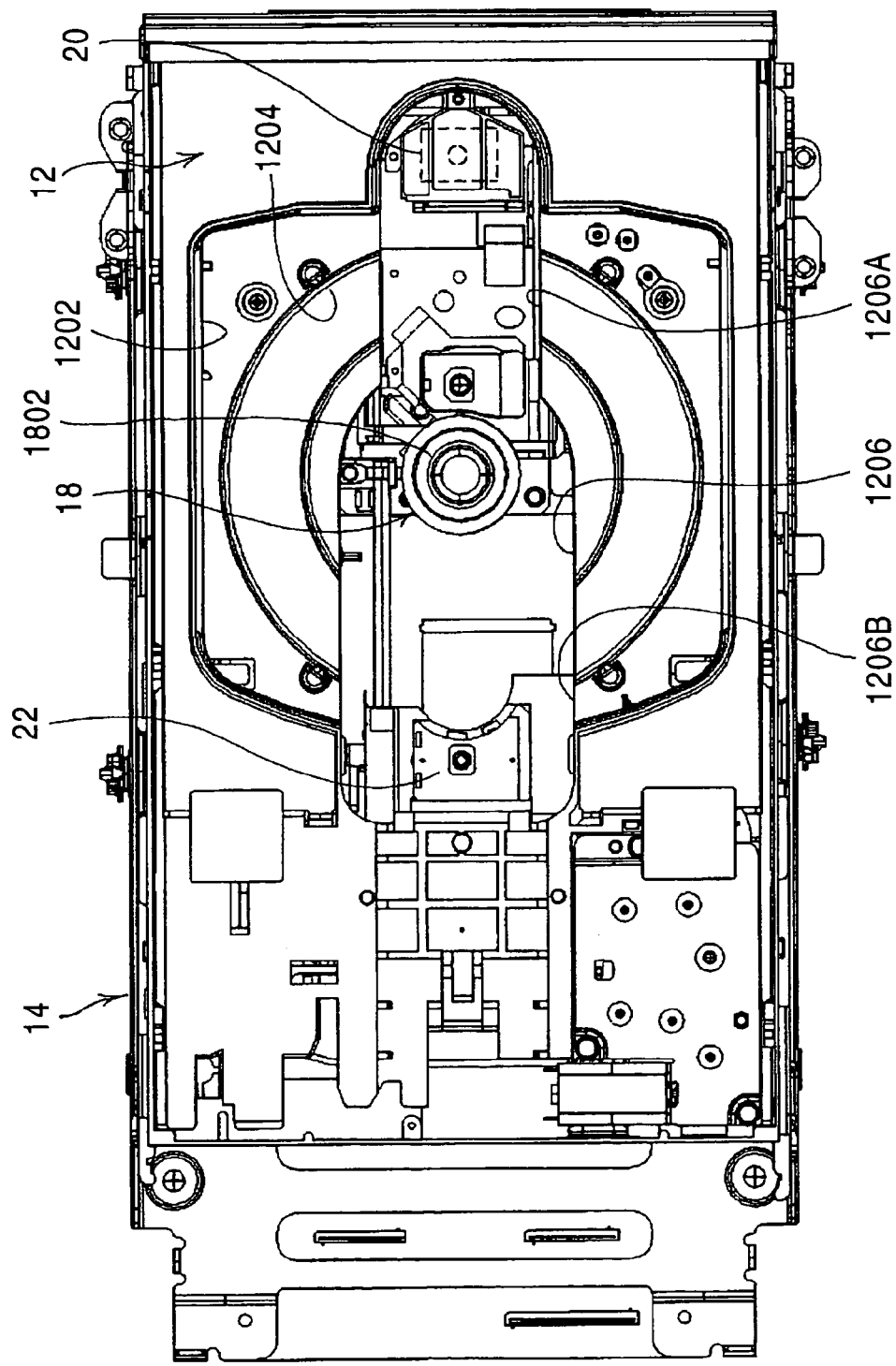
FIG. 6 is a plan view showing a state wherein a cover and a cover piece have been removed in the state shown in FIG. 5.
Figure 7:
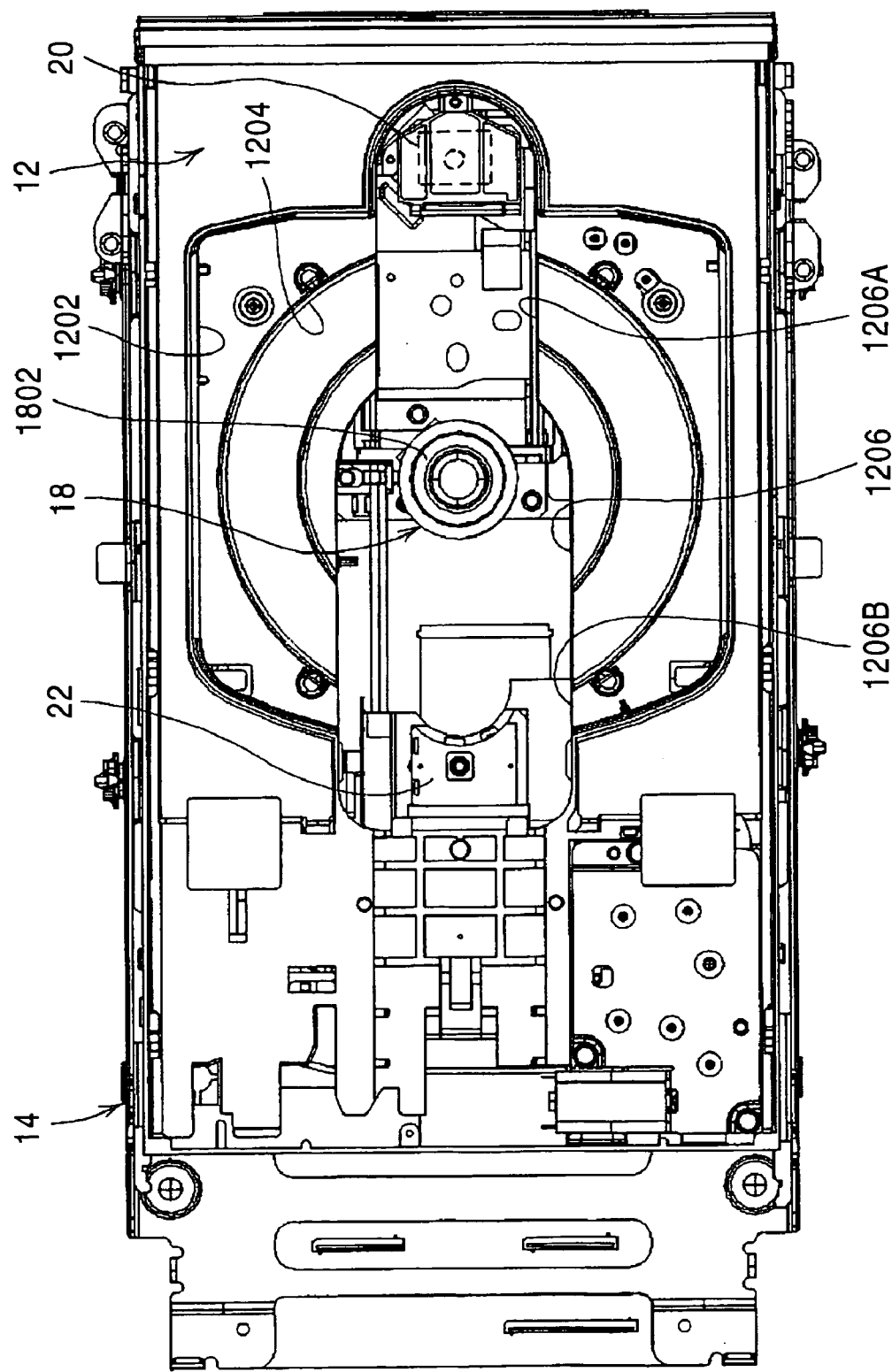
FIG. 7 is a plan view showing a state wherein a first pickup is located in an actuating position.
Figure 8:
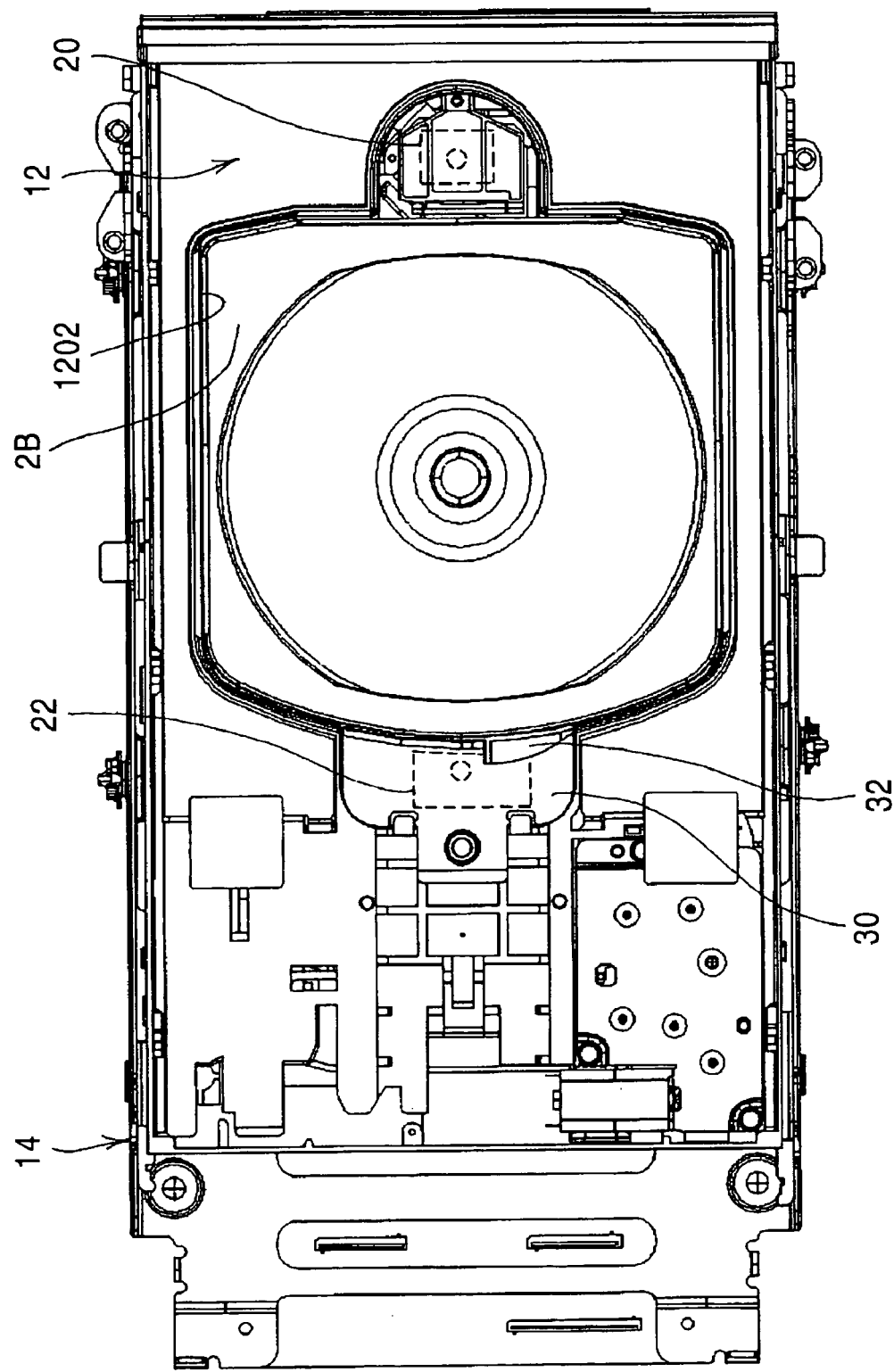
FIG. 8 is a plan view showing a state wherein a tray housing a disk cartridge is at the retracted position.
Figure 9:
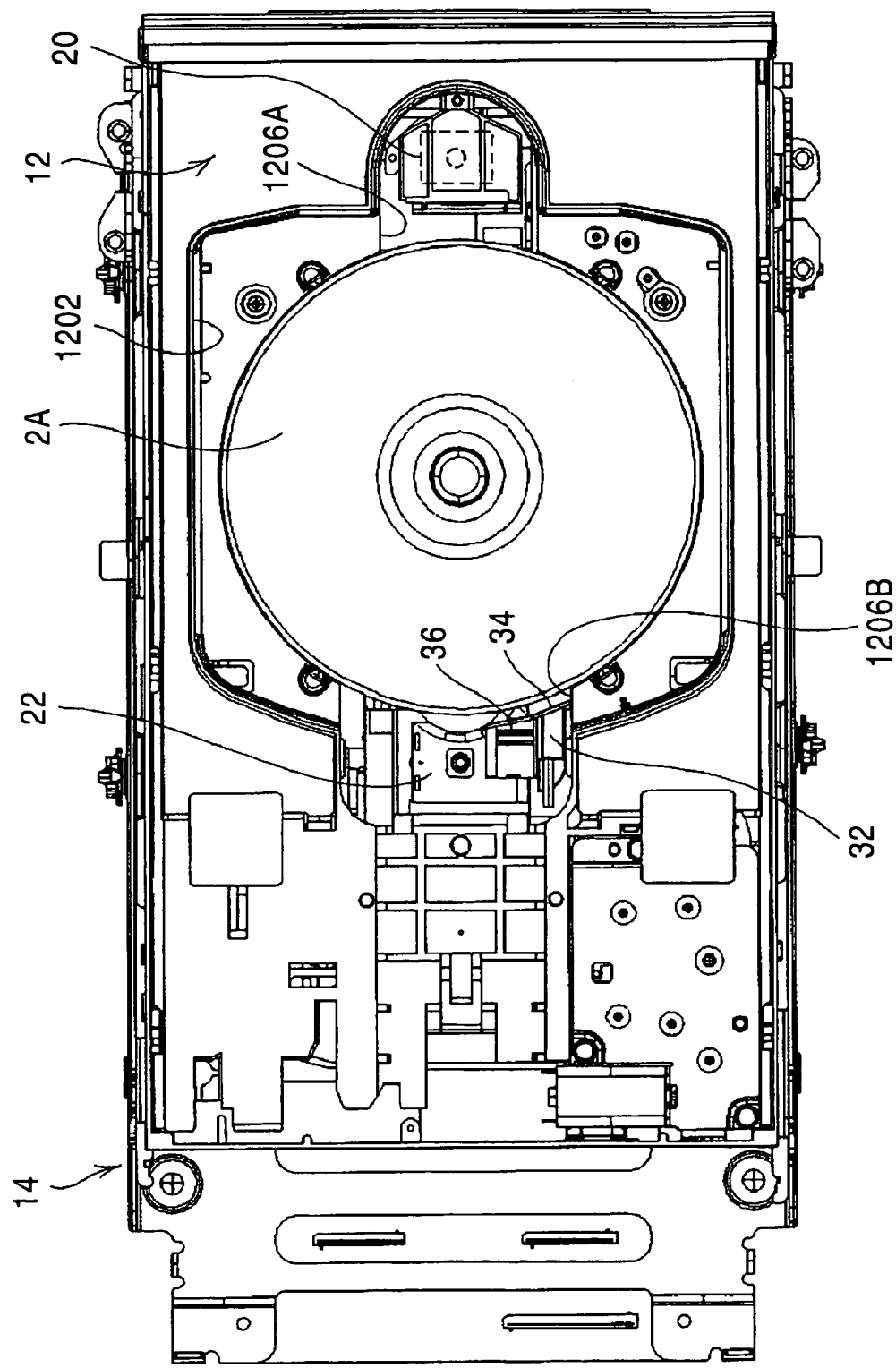
FIG. 9 is a plan view showing a state wherein a tray loaded with a bare disk-shaped recording medium is in the retracted position.
Figure 10:
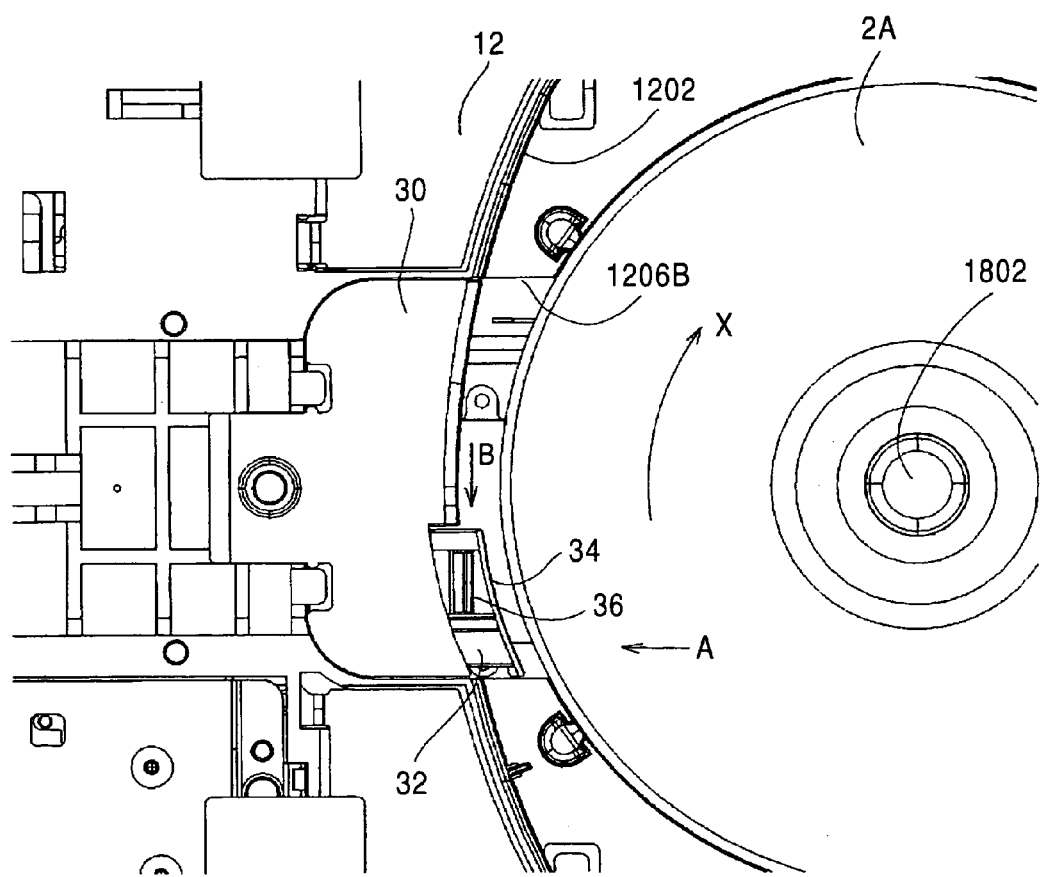
FIG. 10 is an enlarged plan view showing a neighborhood of a cover.
Figure 11:
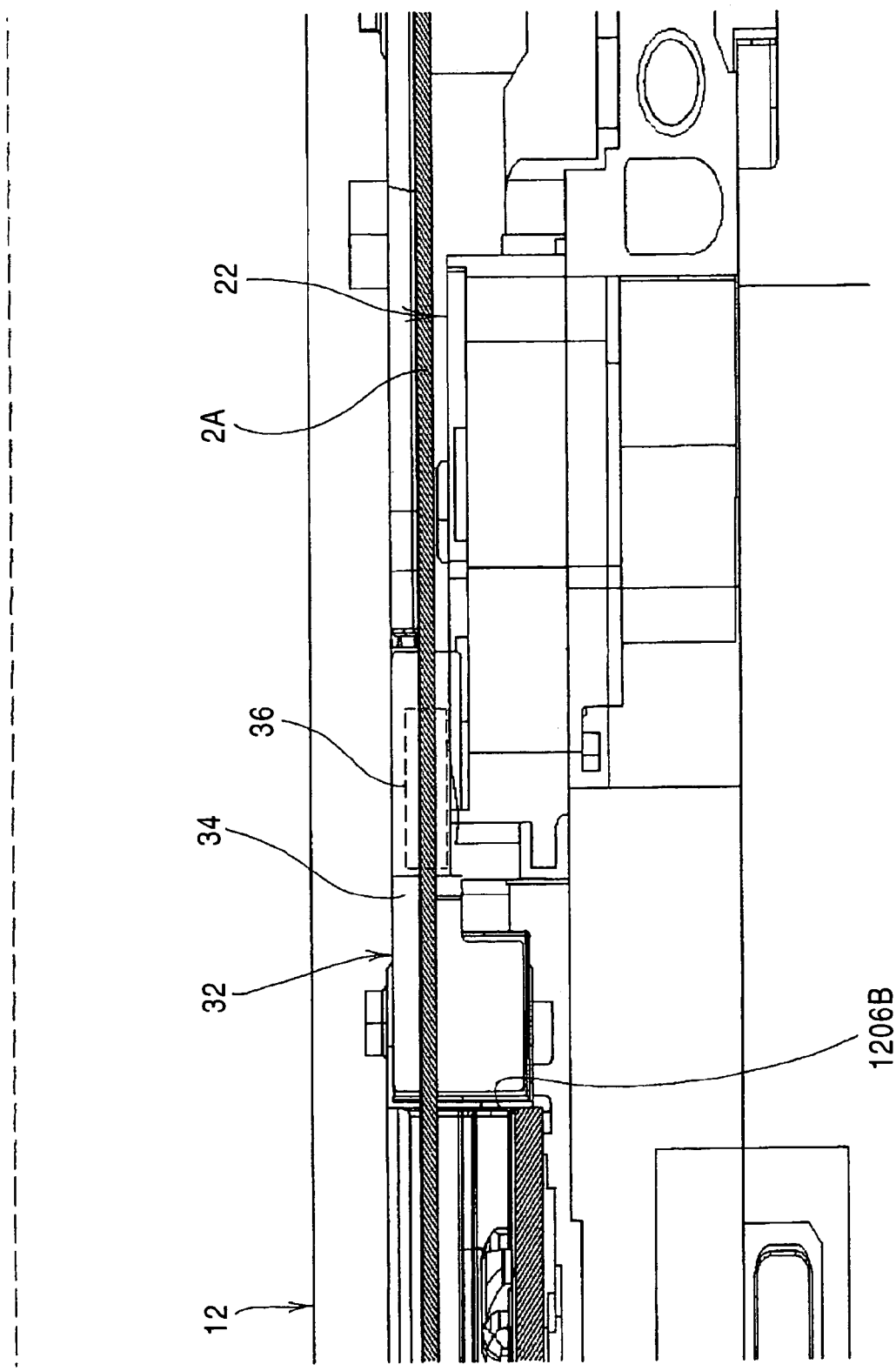
FIG. 11 is a fragmentary view taken in the direction of arrow A shown in FIG. 10.
Figure 12:
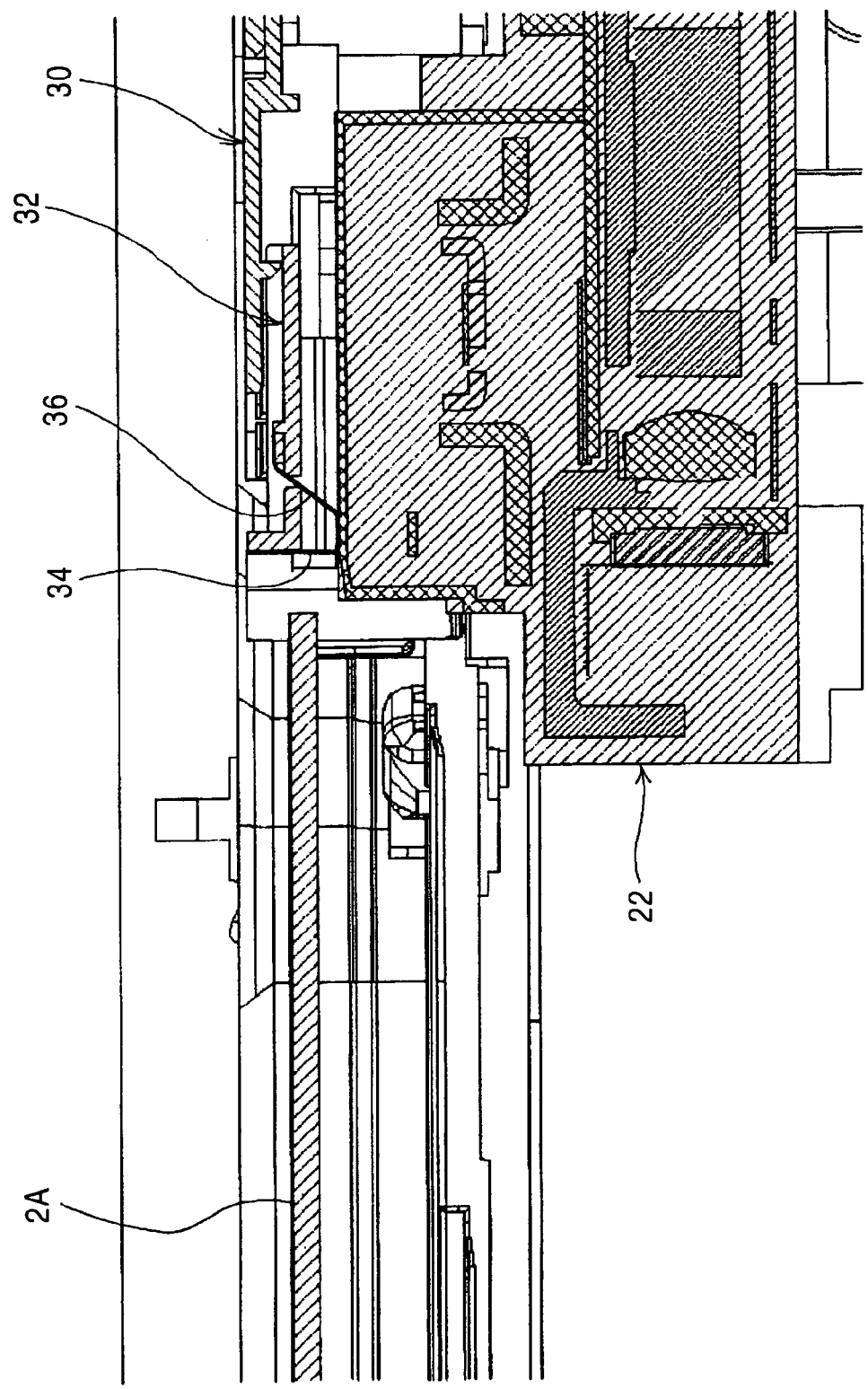
FIG. 12 is a fragmentary view taken in the direction of arrow B shown in FIG. 10.
Figure 13:
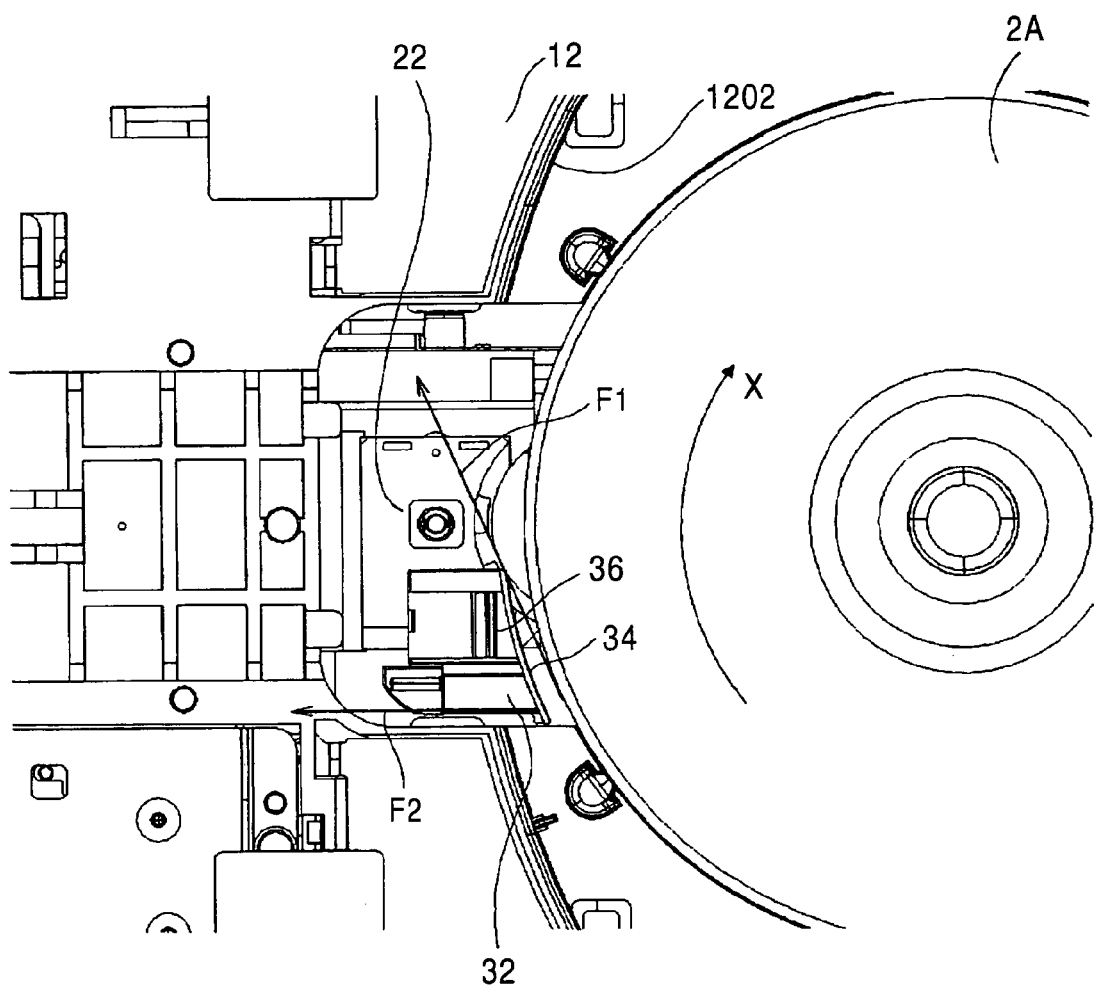
FIG. 13 is an explanatory diagram showing airflows produced by the rotation of the disk-shaped recording medium.

FIG. 1 is an exploded perspective view of a disk drive unit according to an embodiment of the present invention, FIG. 2 is a partial perspective view of a main body of the disk drive unit, FIG. 3 is a plan view of the main body, FIG. 4 is a plan view showing a state wherein a tray is at an ejected position, FIG. 5 is a plan view showing a state wherein the tray is in the retracted position, FIG. 6 is a plan view showing a state wherein a cover and a cover piece have been removed in the state shown in FIG. 5, FIG. 7 is a plan view showing a state wherein a first pickup is in an actuating position, FIG. 8 is a plan view showing a state wherein a tray housing a disk cartridge is in the retracted position, FIG. 9 is a plan view showing a state wherein a tray loaded with a bare disk-shaped recording medium is at the retracted position, FIG. 10 is an enlarged plan view showing a neighborhood of a cover, FIG. 11 is a fragmentary view taken in the direction of arrow A shown in FIG. 10, FIG. 12 is a fragmentary view taken in the direction of arrow B shown in FIG. 10, and FIG. 13 is an explanatory diagram showing airflows produced by the rotation of the disk-shaped recording medium.

Figure 16A:
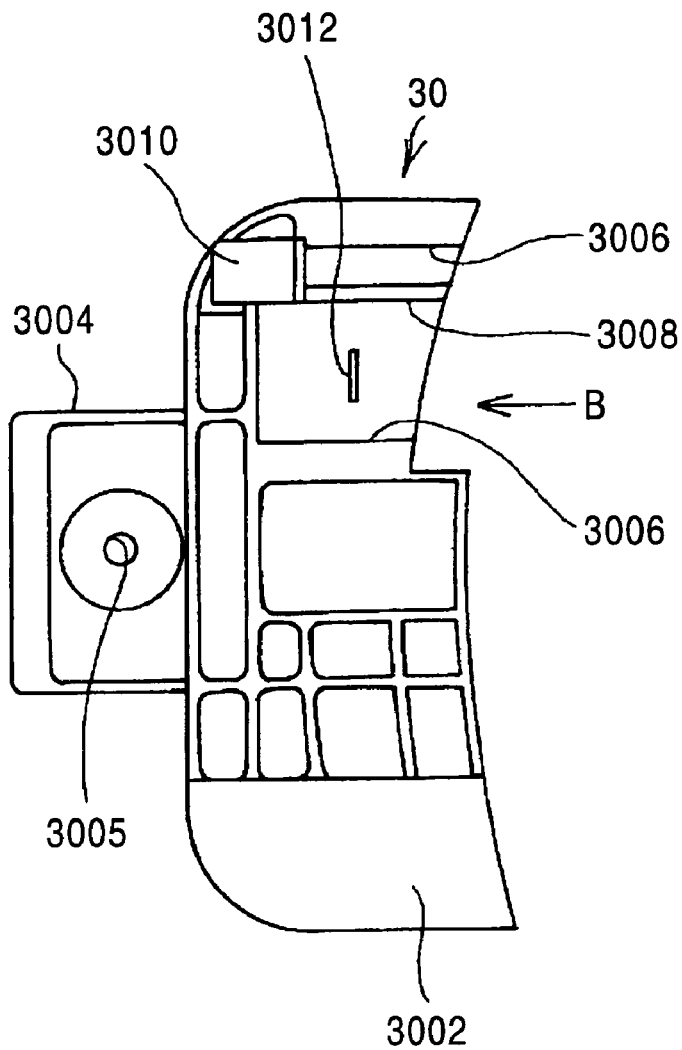
FIG. 16A is a bottom view of the cover and FIG. 16B is a fragmentary view taken in the direction of arrow B shown in FIG. 16A.
Figure 16B:
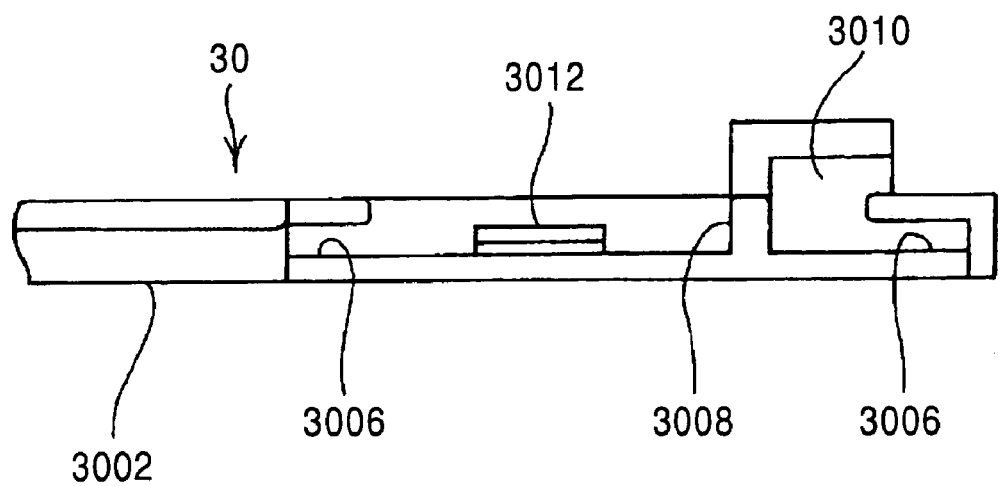
Figures 17B, 17C:
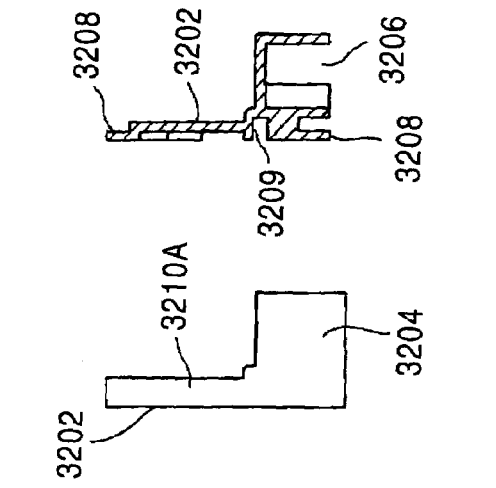
FIG. 17B is a fragmentary view taken in the direction of arrow B shown in FIG. 17A.
FIG. 17C is a sectional view taken at line C-C shown in FIG. 17A.
Figure 17A:
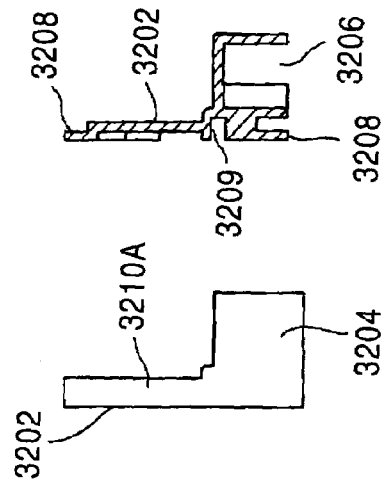
FIG. 17A is a plan view of a cover piece.
Figure 17D:
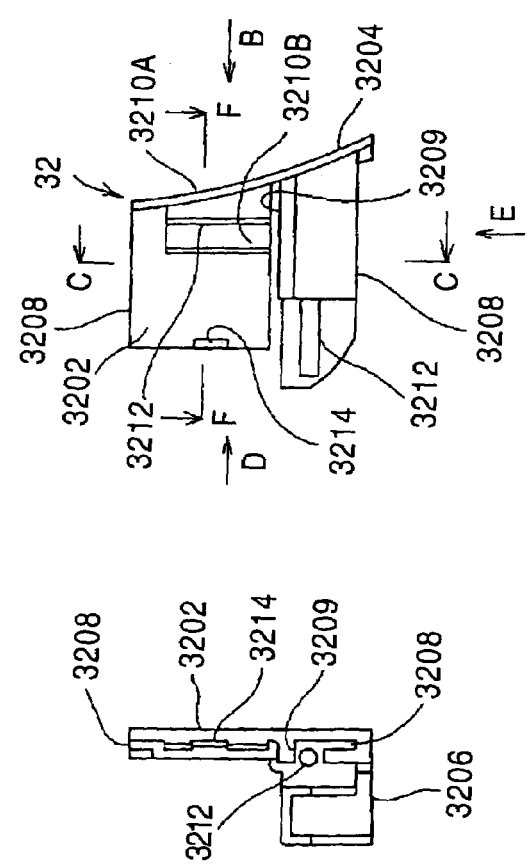
FIG. 17D is a fragmentary view taken in the direction of arrow D shown in FIG. 17A.
Figure 17F:
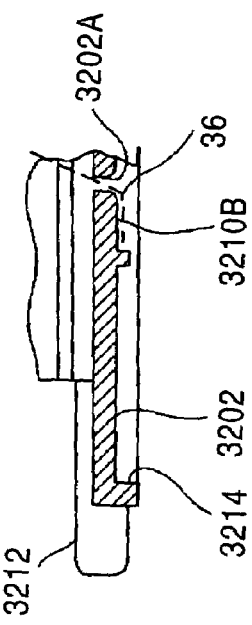
FIG. 17F is a sectional view taken at line F-F shown in FIG. 17A.
Figure 17E:
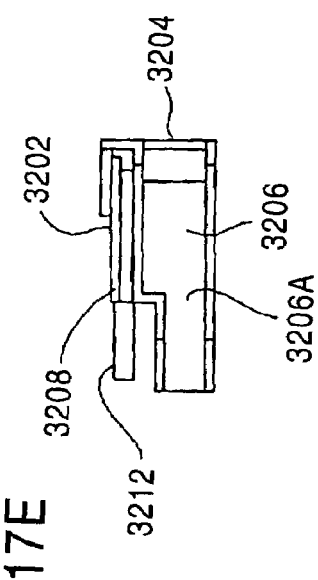
FIG. 17E is a fragmentary view taken in the direction of arrow E shown in FIG. 17A.
Figure 18B:
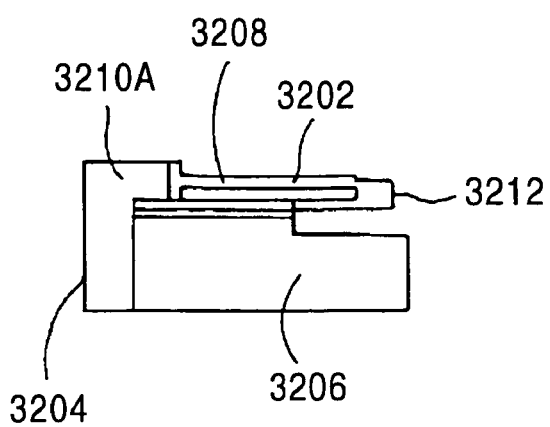
FIG. 18B is a fragmentary view taken in the direction of arrow B shown in FIG. 18A.
Figure 18C:
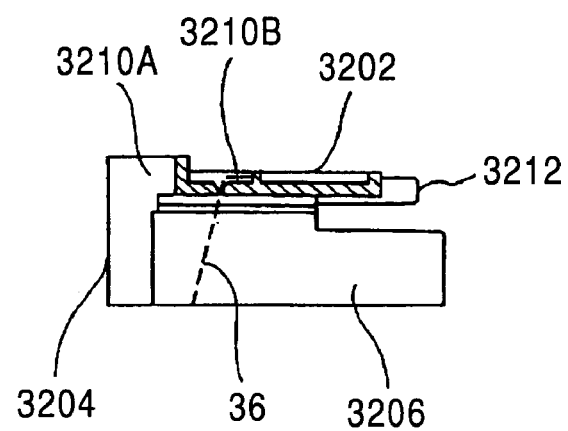
FIG. 18C is a sectional view taken at line C-C shown in FIG. 18A.
Figure 18A:
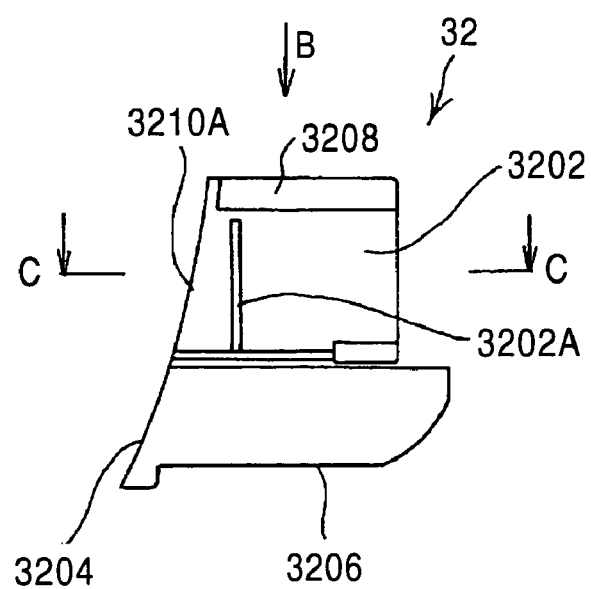
FIG. 18A is a bottom view of the cover piece.
Figure 19A:
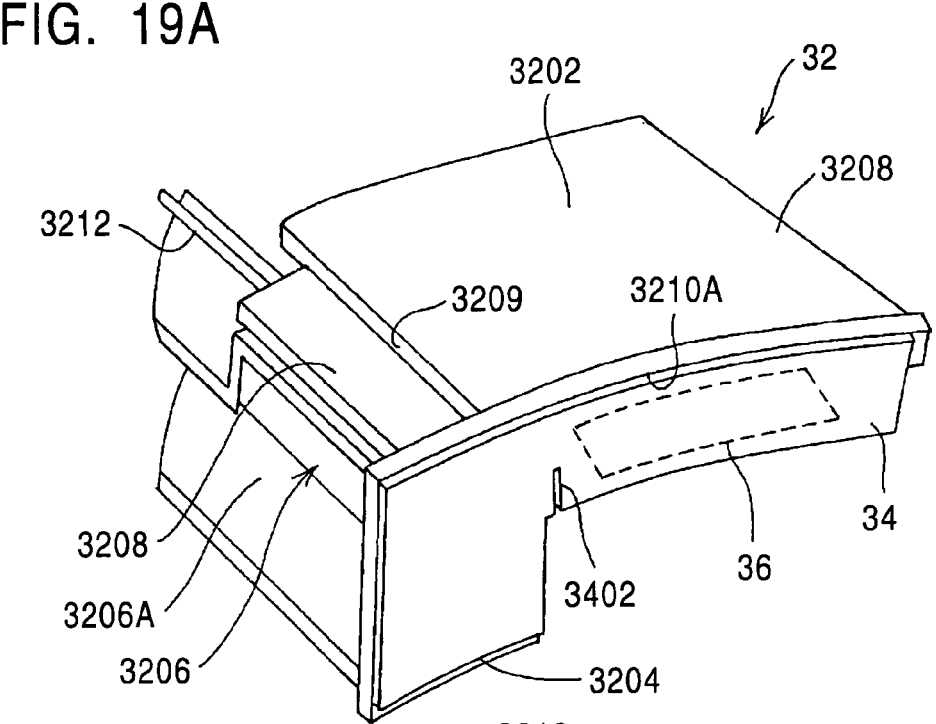
FIG. 19A is a perspective view of the cover piece observed at an angle from left front.
Figure 19B:
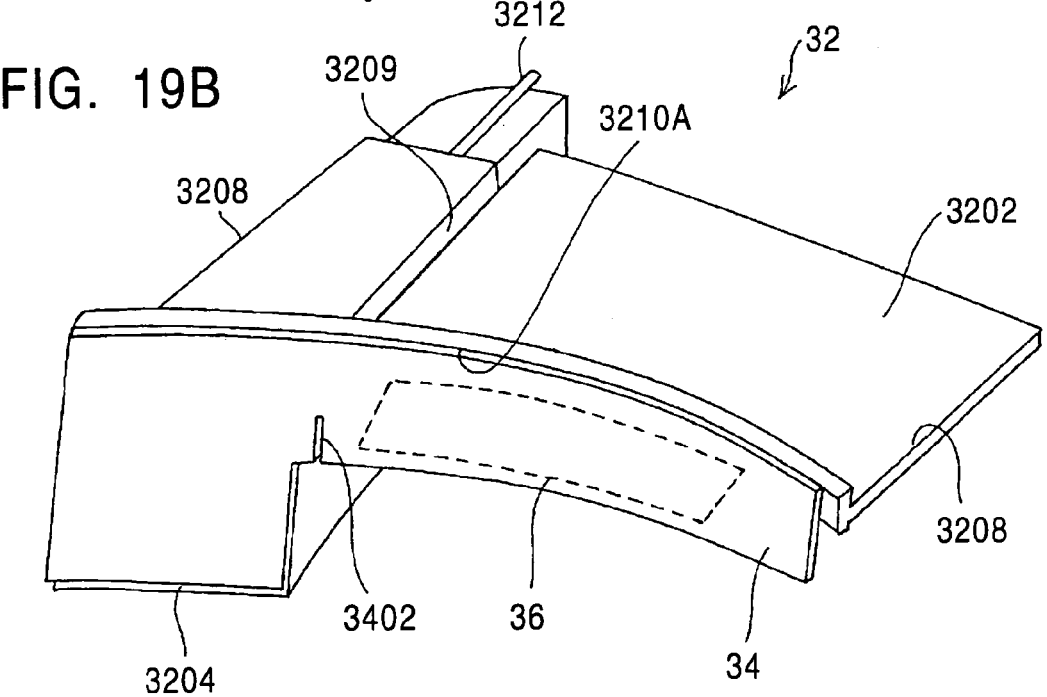
FIG. 19B is a perspective view of the cover piece observed at an angle from right front.
Figure 20:
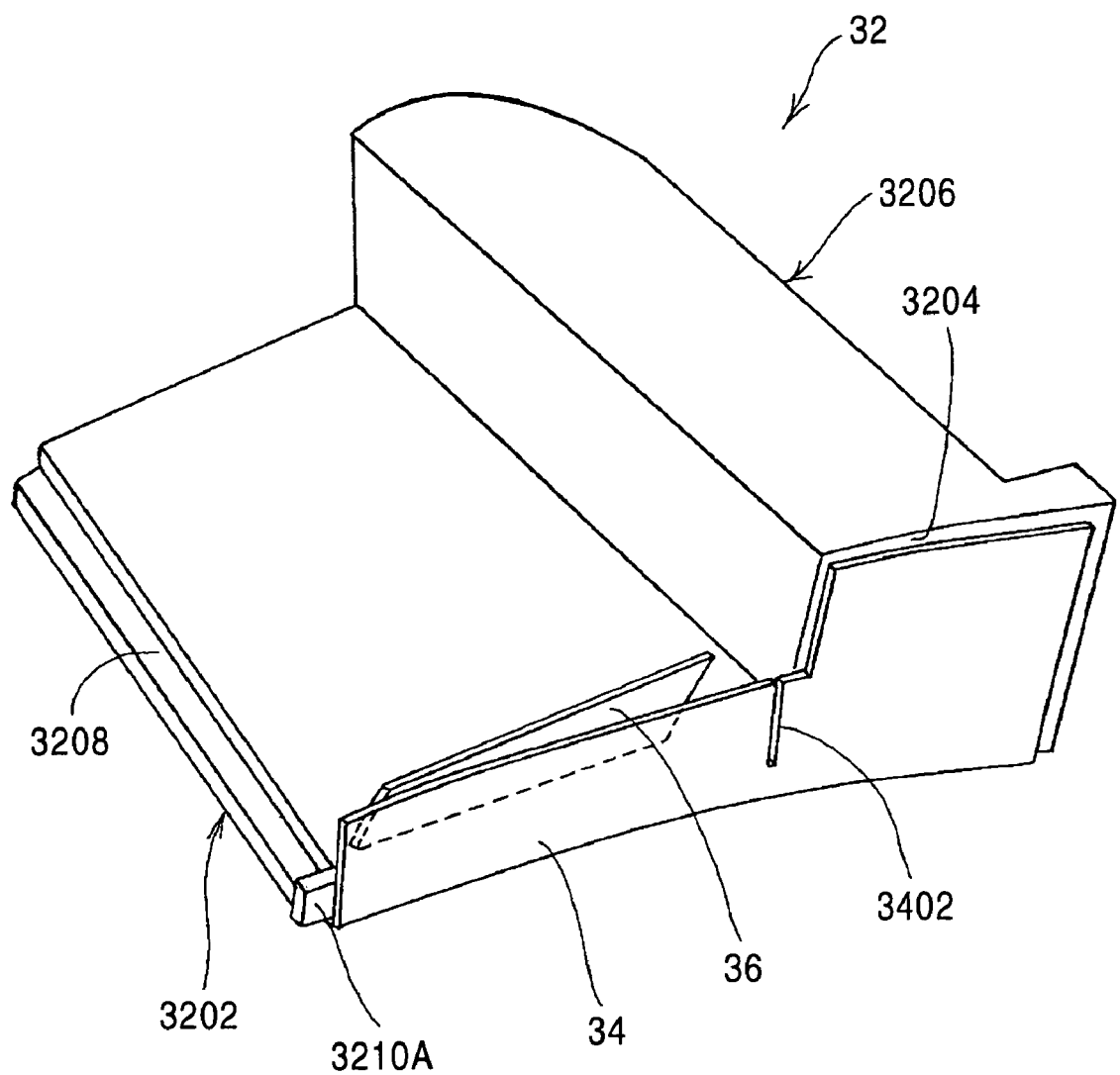
FIG. 20 is a perspective view of the cover piece observed from below.
Figure 21B:
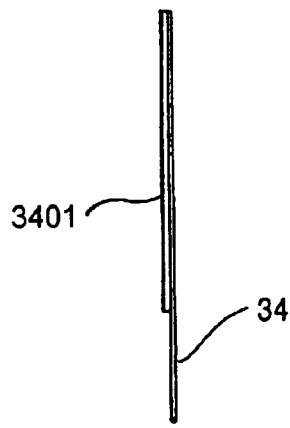
FIG. 21B is a fragmentary view taken in the direction of arrow B shown in FIG. 21A.
Figure 21A:
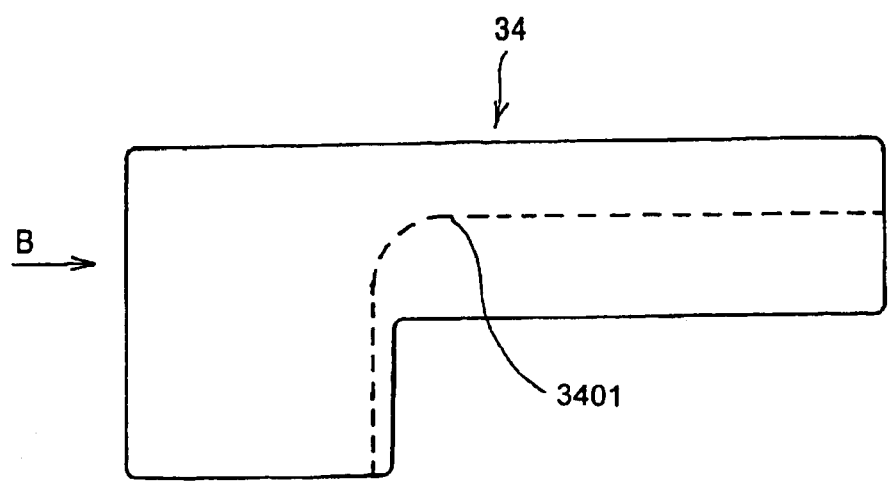
FIG. 21A is a plan view of a first film member.
Figure 22A:
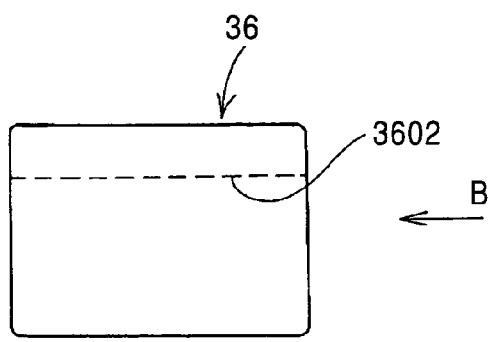
FIG. 22A is a plan view of a second film member.
Figure 22B:
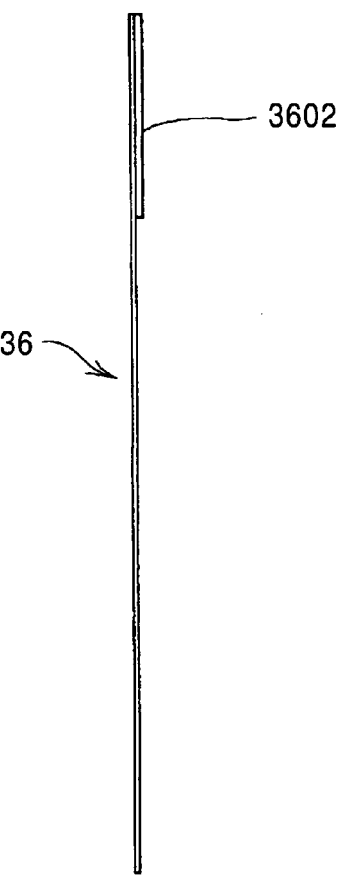
FIG. 22B is a fragmentary view taken in the direction of arrow B shown in FIG. 22A.

FIG. 14A is an assembly diagram of the cover, FIG. 14B is a bottom view of the cover shown in FIG. 14A, and FIG. 14C is a sectional view taken at line C-C shown in FIG. 14B. FIG. 15A is a plan view of the cover, FIG. 15B is a fragmentary view taken in the direction of arrow B shown in FIG. 15A, FIG. 15C is a sectional view taken at line C-C shown in FIG. 15A, FIG. 15D is a fragmentary view taken in the direction of arrow D shown in FIG. 15A, and FIG. 15E is a fragmentary view taken in the direction of arrow E shown in FIG. 15A. FIG. 16A is a bottom view of the cover and FIG. 16B is a fragmentary view taken in the direction of arrow B shown in FIG. 16A. FIG. 17A is a plan view of a cover piece, FIG. 17B is a fragmentary view taken in the direction of arrow B shown in FIG. 17A, FIG. 17C is a sectional view taken at line C-C shown in FIG. 17A, FIG. 17D is a fragmentary view taken in the direction of arrow D shown in FIG. 17A, FIG. 17E is a fragmentary view taken in the direction of arrow E shown in FIG. 17A, and FIG. 17F is a sectional view taken at line F-F shown in FIG. 17A. FIG. 18A is a bottom view of the cover piece, FIG. 18B is a fragmentary view taken in the direction of arrow B shown in FIG. 18A, and FIG. 18C is a sectional view taken at line C-C shown in FIG. 18A. FIG. 19A is a perspective view of the cover piece observed at an angle from left front, and FIG. 19B is a perspective view of the cover piece observed at an angle from right front. FIG. 20 is a perspective view of the cover piece observed from below. FIG. 21A is a plan view of a first film member, and FIG. 21B is a fragmentary view taken in the direction of arrow B shown in FIG. 21A. FIG. 22A is a plan view of a second film member, and FIG. 22B is a fragmentary view taken in the direction of arrow B shown in FIG. 22A.

As shown in FIG. 1, a disk drive unit 100 has a housing 10 and a tray 12. The tray 12 reciprocates between a retracted position (FIG. 5) where information is recorded in or reproduced from a disk-shaped recording medium or a disk cartridge mounted on the tray 12 drawn into the housing 10 through a slot 1402 of the housing 10 and an ejected position (FIG. 4) where the tray 12 is drawn out of the housing 10 to load or unload a disk-shaped recording medium or a disk cartridge.

The housing 10 is formed to have a rectangular plate shape having its longitudinal dimension larger than its lateral dimension. The longitudinal direction of the housing 10 coincides with the direction in which the tray 12 moves.

The housing 10 has a main body 14 with an open top and has a rectangular shape as observed from above, a top plate 16 covering the top surface of the main body 14, and a cover 17 covering the top plate 16.

The main body 14 has a rectangular bottom wall that extends longitudinally, a front wall and a rear wall are vertically raised from the front and rear sides of the bottom wall, and two side walls are vertically raised from the right and left sides of the bottom wall. The front wall has the slot 1402.

Referring to FIG. 2 and FIG. 3, a spindle motor 18 serving as the rotative driving device for rotating a disk-shaped recording medium is provided substantially at the center of the bottom wall of the main body 14. A first pickup 20 and a second pickup 22 are provided, sandwiching the spindle motor 18.

The first pickup 20 and the second pickup 22 are arranged in the longitudinal direction of the main body 14, the spindle motor 18 being sandwiched therebetween. The first pickup 20 is located at the front relative to the spindle motor 18, while the second pickup 22 is located at the rear relative to the spindle motor 18.

To be more specific, the first pickup 20 is constructed such that it is movably guided by a guide rail 1404 between a retreated position (FIG. 6) where it is away from the spindle motor 18 in the direction in which the tray 12 moves toward the ejected position from the retracted position and an actuation position (FIG. 7) where it faces the bottom surface of a disk-shaped recording medium 2A at the retracted position of the tray 12.

The second pickup 22 is constructed such that it is movably guided by a guide rail 1406 between a retreated position (FIG. 7) where it is away from the spindle motor 18 in the direction in which the tray 12 moves toward the retracted position from the ejected position and an actuation position (FIG. 6) where it faces the bottom surface of a disk-shaped recording medium accommodated in a disk cartridge 2B at the retracted position of the tray 12.

An object lens of the first pickup 20, the center of the spindle motor 18, and an object lens of the second pickup 22 are disposed on the same straight line passing the main body 14 in the longitudinal direction, an optical axis facing upwards.

Each of the first and second pickups 20 and 22 primarily includes a light source, a light receiving element, and an object lens. In the present embodiment, the first pickup 20 is adapted to record and/or reproduce information in and/or from a CD, CD-R or DVD by laser beams having a wavelength of, for example, 650 nm or 680 nm. The second pickup 22 is adapted to record and/or reproduce information in and/or from a DVR (blue ray disk) for high-density recording by laser beams having a wavelength of, for example, 405 nm.

Referring to FIG. 1, the spindle motor 18 has a rotary shaft, and the upper end of the rotary shaft is provided with a flange-shaped turntable 1802 that rotates integrally with the rotary shaft, the bottom surface of a chucked portion of a disk-shaped recording medium being placed on the turntable 1802. The turntable 1802 includes a magnet. As the rotary shaft moves in the vertical direction, i.e., in the axial direction, the turntable 1802 travels between a lower retreated position where the turntable 1802 is apart from the bottom surface of the chucked portion of the disk-shaped recording medium set on the tray or the disk-shaped recording medium in a disk cartridge set on the tray, and an upper chucking position where the turntable 1802 is in contact with the bottom surface of the chucked portion.

As shown in FIG. 1, the tray 12 is shaped like a rectangular plate having its longitudinal dimension larger than its lateral dimension. The tray 12 is moved in the longitudinal direction by a driving device and a guiding device, which are not shown.

The top surface of the tray 12 has a first recessed portion 1202 having a rectangular outline. The bottom surface of the first recessed section 1202 has a second recessed portion 1204 which has a round shape and a smaller outline than that of the first recessed portion 1202. A disk cartridge 2B (FIG. 8) shaped like a rectangular plate that has a cartridge case accommodates a disk-shaped recording medium therein is placed in the first recessed portion 1202. A bare disk-shaped recording medium (FIG. 9) is placed in the second recessed portion 1204. In the present embodiment, information is recorded and/or reproduced in and/or from a bare disk-shaped recording medium 2A (FIG. 9) by the first pickup 20, while information is recorded and/or reproduced from the disk cartridge 2B (FIG. 8) by the second pickup 22.

At the bottoms of the first and second recessed portions 1202 and 1204, a cutout 1206 extending in the longitudinal direction is provided.

The cutout 1206 has a first cutout 1206A for the first pickup 20 and a second cutout 1206B for the second pickup 22, both cutouts 1206A and 1206B extending linearly and continuously. When the tray 12 is in the retracted position, the turntable 1802 is disposed in the portion wherein the cutouts 1206A and 1206B intersect with each other, that is, in a longitudinal central portion of the cutout 1206.

Referring to FIG. 5, a cover 30 is provided to cover the top of the second pickup 22 in the retreated position.

The cover 30 is attached to the tray 12 such that it covers the entire rear area widthwise of the second cutout 1206B. More specifically, the cover 30 is disposed to cover a part of the second cutout 1206B on the radial outer side of the disk-shaped recording medium accommodated in the tray 12. In the present embodiment, as shown in FIG. 8, the cover 30 is disposed such that it covers a portion of the second cutout 1206B that is located outside the disk cartridge 2B.

The cover 30 has a cover piece 32, which is provided in a portion at the front of the cover 30 that is located on the upstream side relative to the rotational direction of the disk-shaped recording medium 2A such that it is movable in a direction parallel to the direction in which the second pickup 22 moves and also urged in a projected direction.

More specifically, the cover 30 is formed of a synthetic resin, and has a cover main body 3002 that is large enough to cover the entire rear area widthwise of the second cutout 1206B, and a mounting piece 3004 protuberantly provided on the cover main body 3002, as shown in FIGS. 14A, 14B and 14C, FIGS. 15A through 15E, and FIGS. 16A and 16B.

The cover 30 is installed to the tray 12 by tightening a screw inserted in a screw hole 3005 in the mounting piece 3004.

The front edge of the cover main body 3002 is formed to continue from the first recessed portion 1202 of the tray 12.

As shown in FIG. 15D, FIG. 16A, and FIG. 16B, the bottom surface of the cover 30 has a pair of guide grooves 3006 movably supporting the cover piece 32, and a rib 3008 for guiding the cover piece 32 is provided between the guide grooves 3006.

The cover piece 32 is formed of a synthetic resin and has a top portion 3202, a front portion 3204, a side portion 3206, a first film member mounting portion 3210A, and a second film member mounting portion 3210B, as shown in FIGS. 17A through 17F, FIGS. 18A, 18B and 18C, FIGS. 19A and 19B, and FIG. 20.

Slide pieces 3208 movably inserted in the pair of guide grooves 3006 of the cover main body 3002 are provided on the right and left sides of the top portion 3202. A guide groove 3209 engaging the rib 3008 of the cover main body 3002 is also provided.

The side portion 3206 is provided at a location of the top portion 3202 that is positioned on the upstream side relative to the rotational direction of the disk-shaped recording medium 2A.

The side portion 3206 has an airflow guide passage 3206A for guiding an airflow, which is generated when the disk-shaped recording medium rotates, in a direction away from the second pickup 22.

The front portion 3204 is shaped to be continuous from a side wall of the first recessed portion 1202 of the tray 12. The front portion 3204 is positioned at the front of the top portion 3202 and the side portion 3206.

The front portion 3204 has a height in the direction of the thickness of the disk-shaped recording medium 2A mounted on the tray 12 and a length in the circumferential direction of the disk-shaped recording medium 2A.

As shown in FIG. 17B, FIGS. 19A and 19B, and FIG. 20, the first film member mounting portion 3210A is smaller in height than the front portion 3204 and is formed such that it extends in the circumferential direction of the disk-shaped recording medium 2A accommodated in the tray 12 from the upper end of the front portion 3204 at the downstream end in the rotational direction of the disk-shaped recording medium 2A when recording and/or reproducing information. In the present embodiment, the first film member mounting portion 3210A is formed at the front edge of the top portion 3202.

As shown in FIG. 17F, the second film member mounting portion 3210B is provided at the upper position of the top portion 3202 that is positioned farther outward in the radial direction of the disk-shaped recording medium 2A accommodated in the tray 12 than the first film member mounting portion 3210A.

Referring to FIG. 11 and FIG. 21A, the first film member 34 has a height in the direction of the thickness of the disk-shaped recording medium 2A accommodated in the tray 12 and a length in the circumferential direction of the disk-shaped recording medium 2A. As shown in FIG. 21A, the upper end of the first film member 34 is attached to the first film member mounting portion 3210A through the intermediary of a double-sided adhesive tape 3401, as shown in FIGS. 19A and 19B, FIG. 20, and FIG. 21B.

The first film member 34 hangs from the front edge of the top portion 3202, and forms the surface that continues to the front portion 3204.

In the present embodiment, the first film member 34 is provided from the front portion 3204 to the first film member mounting portion 3210A through the intermediary of the double-sided adhesive tape 3401. The portion of the first film member 34 that faces the front portion 3204 is provided with a slit 3402 extending in the height direction.

The second film member 36 has a height in the direction of the thickness of the disk-shaped recording medium 2A accommodated in the tray 12 and a length in the circumferential direction of the disk-shaped recording medium 2A, as shown FIG. 11 and FIG. 22A.

The upper end of the second film member 36 is attached, through the double-sided adhesive tape 3602 (FIG. 22B), to the second film member mounting portion 3210B at the upper surface of the top portion 3202 and hangs down below the top portion through a slit 3202A, as shown in FIG. 12, FIG. 17F, and FIG. 18C.

As shown in FIG. 20, the second film member 36 is provided such that it is spaced from the first film member 34 on the upstream side relative to the rotational direction of the disk-shaped recording medium 2A, while it is close to the first film member 34 on the downstream side relative to the rotational direction. More specifically, the second film member 36 is provided such that the distance thereof from the first film member 34 is larger on the upstream side relative to the rotational direction of the disk-shaped recording medium 2A, while the distance therebetween is smaller on the downstream side relative to the rotational direction.

The first film member 34 and the second film member 36 are made of a material that is sufficiently strong not to be flexed by airflows generated when the disk-shaped recording medium rotates. For example, a thin tape made of a synthetic resin may be used.

In the present embodiment, the first film member 34 is disposed such that its lower end is in contact with the front top surface of the case of the second pickup 22 located at the retreated position.

The second film member 36 is disposed such that its lower end is in contact with the front top surface of the case of the second pickup 22 located in the retreated position, and inclined such that the second film member 36 approaches the first film member 34 at its lower position, that is, it is inclined toward the turntable 1802, as shown in FIG. 12.

The description will now be given of the installation of the cover piece 32 to the cover 30.

Referring to FIGS. 14A and 14C, a coil spring 3213 is wound around the winding shaft 3212 projecting at the rear of the cover piece 32 and the coil spring 3213 is placed in a spring housing 3010 of the cover 30. Slide pieces 3208 of the cover piece 32 are inserted in the pair of guide grooves 3006 of the cover 30, respectively, and the rib 3008 is fitted in the guide groove 3209 of the cover piece 32.

Then, the cover piece 32 is pushed into the cover 30 to cause an engaging protuberance 3214 of the cover piece 32 shown in FIGS. 17A, 17D, and 17F to override an engaging protuberance 3012 of the cover main body 3002 of the cover 30 shown in FIG. 16A.

This allows the cover piece 32 to move in the direction parallel to the direction in which the second pickup 22 moves and also urges the cover piece 32 in a projecting direction by the coil spring 3213. Thus, the cover piece 32 travels between the retreated position where the front portion 3204 retracts in contact with the end surface of the disk cartridge 2B accommodated in the tray 12 and the projected position where the front portion 3204 faces the outer circumference of the disk-shaped recording medium in the tray 12. The projected position of the cover piece 32 depends on the engagement between the engaging portion 3214 and the engaging portion 3012.

The cover 30 to which the cover piece 32 has been attached as described above is installed to the tray 12. The cover 30 is installed to the tray 12 by tightening the screw in the screw hole 3005 of the mounting piece 3004 of the cover 30.

The assembly of the housing 10 will now be explained.

Referring to FIG. 4, an opening 1604 extending in the longitudinal direction is formed in a central portion of the top plate 16, and an arm 24 is disposed inside the opening 1604 such that it may vertically swing.

A holder made of a synthetic resin is provided at the front of the arm 24, and a magnetic member 26 made of a magnetic material, such as iron, attracted to a magnet is disposed on the bottom surface of the holder.

As shown in FIG. 1, the cover 17 includes a top surface 1702 that is sufficiently large to cover the top opening of the main body 14, and a side surface 1704 provided so as to hang from the right and left sides and the rear of the top surface.

The top surface 1702 of the cover 17 has an accommodating recessed portion 1708, and the front portion of the arm 24 is placed in the accommodating recessed portion 1708.

The top plate 16 is set onto the main body 14 inserted in the opening in the top surface, and the cover 17 is installed by fitting the screws inserted in the screw inserting holes 1706 of the side surface 1704 into the tapped holes in the side wall of the main body 14. This assembles the housing 10.

The recording/reproducing operation of the first pickup will now be explained.

Referring to FIG. 9 and FIG. 10, the tray 12 in which the bare disk-shaped recording medium 2A has been placed in the second recessed portion 1204 moves from the ejected position to the retracted position and the turntable 1802 moves from the retreated position to a chucking position, causing the bottom surface of the chuck portion of the disk-shaped recording medium 2A to be moved upward while it is mounted on the turntable 1802. This causes the magnetic member 26 to be attracted to the magnet of the turntable 1802 with the chuck portion therebetween, so that the chucked portion of the disk-shaped recording medium 2A is held between the turntable 1802 and the magnetic member 26.

In this state, the spindle motor 18 is driven to rotate the turntable 1802, rotatively driving the disk-shaped recording medium 2A together with the magnetic member 26. Thus, information is recorded and/or reproduced in and/or from the disk-shaped recording medium 2A by the first pickup 20 through the first cutout 1206A.

After that, the turntable returns from the chucking position to the retreated position, and the tray 12 returns from the retracted position to the ejected position.

The recording/reproducing operation of the second pickup will now be explained.

Referring to FIG. 8, the tray 12 in which the disk cartridge 2B has been placed in the first recessed portion 1202 moves from the ejected position to the retracted position and the turntable 1802 moves from the retreated position to a chucking position, causing the turntable 1802 to come in contact with the bottom surface of the chuck portion of the disk-shaped recording medium of the disk cartridge 2B. At this time, a magnetic member (not shown) provided in the disk cartridge 2B is attracted to the magnet of the turntable 1802 with the chucked portion of the disk-shaped recording medium therebetween so as to chuck the disk-shaped recording medium.

In this state, the spindle motor 18 is driven to rotate the turntable 1802, rotatively driving the disk-shaped recording medium together with the magnetic member. Thus, information is recorded and/or reproduced in and/or from the disk-shaped recording medium by the second pickup 22 through the second cutout 1206B.

After that, the turntable 1802 returns from the chucking position to the retreated position, and the tray 12 returns from the retracted position to the ejected position.

Operations and advantages of the cover 30 and the cover piece 32 will now be explained.

When the disk cartridge 2B is set in the tray 12, the front portion 3204 of the cover piece 32 is moved from the projected position to the retracted position by the end surface of the disk cartridge 2B, as shown in FIG. 8.

In this state, the front edge of the cover 30 continuously extends to the side surfaces of the first recessed portion 1202 of the tray 12. The front portion 3204 of the cover piece 32 abuts against the end of the disk cartridge 2B accommodated in the tray 12, and the cover piece 32 is located at the retracted position.

In this state, when the tray 12 is moved from the ejected position to the retracted position, or when the turntable 1802 moves between the retreated position and the chucking position, vibration is generated. The vibration is transmitted to the disk cartridge 2B and the tray 12, causing dust on the disk cartridge 2B or the tray 12 to be scattered inside the housing 10.

The upper side of the second pickup 22 located in the retreated position is covered by the cover 30 and the cover piece 32 located in the retracted position. This makes it possible to prevent the dust flying toward the second pickup 22 from adhering thereto by the cover 30 and the cover piece 32.

The aforesaid arrangement advantageously prevents inconveniences caused by dust adhering to the object lens of the second pickup 22. The dust on the object lens leads to a reduction in quantity of light reaching the disk-shaped recording medium, and may cause a recording or reproducing failure or excessive drive current supplied to the light source of the second pickup 22 to compensate for the reduced quantity of light, resulting in deterioration of the light source.

When the bare disk-shaped recording medium 2A is set in the tray 12, the front portion 3204 of the cover piece 32 will be in the projected position, as shown in FIG. 10.

In this state, a slight gap is formed between the front edge of the cover 30 and the outer circumference of the disk-shaped recording medium 2A. With the front portion 3204 of the cover piece 32 being located in the projected position, a gap that is smaller than the gap between the front edge of the cover 30 and the outer circumference of the disk-shaped recording medium 2A being formed between the front portion 3204 and the outer circumference of the disk-shaped recording medium 2A.

In this state, if vibration is generated when the tray 12 is moved from the ejected position to the retracted position, or when the turntable 1802 moves between the retreated position and the chucking position, dust on the disk-shaped recording medium 2A or the tray 12 is scattered inside the housing 10.

The upper side of the second pickup 22 located in the retreated position is covered by the cover 30 and the cover piece 32 located in the retracted position. This makes it possible to prevent the dust flying toward the second pickup 22 from adhering thereto by the cover 30 and the cover piece 32.

Thus, the aforesaid arrangement also advantageously prevents inconveniences caused by dust adhering to the object lens of the second pickup 22.

Referring now to FIG. 13, when the tray 12 is moved to the retracted position with the bare disk-shaped recording medium 2A set in the tray 12, and then the disk-shaped recording medium 2A is chucked by the turntable 1802 and rotatively driven in the direction of arrow X, airflows are generated by the rotation of the disk-shaped recording medium 2A, as shown in FIG. 13. The cover 30 is not shown in FIG. 13.

When such airflows are generated, dust on the tray 12 or the disk-shaped recording medium 2A is scattered inside the housing 10.

As shown in FIGS. 10, 11 and 12, the cover piece 30 at the projected position has the first film member 34 and the second film member 36, making it possible to prevent dust scattered toward the second pickup 22 located at the retreated position from adhering to the second pickup 22 by the first film member 34 and the second film member 36.

Of the airflows, an airflow moving toward the second pickup 22 is led by the first film member 34 attached to the front portion 3204 in a direction (direction of arrow F1) to be away from the second pickup 22 located in the retreated position, and also led by an airflow guiding passage 3206A in a direction (direction of arrow F2) to be away from the second pickup 22. Thus, the airflow containing dust is directed away from the second pickup 22, advantageously preventing dust from adhering to the second pickup 22.

Accordingly, the arrangement described above advantageously prevents inconveniences caused by dust adhering to the object lens of the second pickup 22.

In the present embodiment, the first film member 34 is provided from the front portion 3204 to the first mounting portion 3210A; therefore, the portion of the first film member 34 that faces the front portion 3204 has the slit 3402. With this arrangement, when the lower end of the first film member 34 comes in contact with the top surface of the case of the second pickup 22, the lower end of the first film member 34 flexes so as to be in contact with the top surface of the case with no clearance therebetween. This advantageously prevents dust from flying toward the second pickup 22.

Furthermore, as shown in FIG. 10, the second film member 36 is provided such that it is spaced away from the first film member 34 on the upstream side relative to the rotational direction of the disk-shaped recording medium 2A, while it is close to the first film member 34 on the downstream side relative to the rotational direction. Hence, an airflow toward the rear side of the first film member 34 is guided by the second film member 36 to move away from the second pickup 22. This advantageously prevents dust from adhering to the second pickup 22.

Furthermore, as shown in FIG. 12, the second film member 36 is disposed to incline so that it is closer to the first film member 34 toward its bottom. With this arrangement, the velocities of airflows passing between the two film members increase, making it possible to effectively block dust moving toward the second pickup 22 by the second film member 36. This advantageously prevents dust from adhering to the second pickup 22.

In the present embodiment, the description has been given of the case where the two pickups, namely, the first pickup 20 and the second pickup 22, are provided. Obviously, however, the present invention can be applied also to a case where only one pickup is provided.

Furthermore, in the present embodiment, the description has been given of the case where the two film members, namely, the first film member 34 and the second film member 36, are used. The present invention, however, is advantageously applied to prevent dust from adhering to pickups also in a case where only one film member is used.

When two pickups are used, the cutouts 1206A and 1206B for the two pickups in the tray 12 do not have to linearly continue. Alternatively, the cutouts may intersect at an angle.

What is claimed is:

1. A disk drive unit comprising:
   a housing;
   a tray for receiving a disk-shaped recording medium or a disk cartridge, and which travels between a retracted position in which the tray is drawn into the housing to perform recording or reproduction and an ejected position in which the tray is drawn out of the housing to load or unload the disk-shaped recording medium or the disk cartridge;
   a pickup, provided in the housing and positioned at a recording/reproducing position which faces the bottom surface of the disk-shaped recording medium at the tray retracted position and where information is recorded and/or reproduced in and/or from the disk-shaped recording medium or disk cartridge;
   driving means for rotating the disk-shaped recording medium when recording and/or reproducing the information; and
   a cover configured to cover the top of the pickup while the tray is at the retracted position, the cover is positioned on the upstream side relative to the rotational direction of a disk-shaped recording medium,
   wherein a cutout is provided in the bottom surface of the tray such that it extends along a travel track of the pickup from the center of the disk-shaped recording medium or disk cartridge of the tray, the cutout being provided for recording and/or reproducing information in and/or from the disk-shaped recording medium.

2. The disk drive unit according to claim 1, wherein the tray comprises an accommodating recessed portion for receiving a disk-shaped recording medium or a disk cartridge, and, wherein,
   the cover comprises a cover piece installed in a portion located on the upstream side relative to the rotational direction of the disk-shaped recording medium when the information is recorded and/or reproduced, and
   the cover piece has a front portion facing the accommodating recessed portion, and is disposed such that the cover piece is movable between a retracted position where the front portion retracts in contact with an end surface of the disc cartridge accommodated in the tray and a projected position where the front portion faces the outer circumference of the disk-shaped recording medium accommodated in the tray, and that the cover piece is urged to be located in the projected position.

3. The disk drive unit according to claim 1, wherein the tray comprises an accommodating recessed portion for accommodating a disk-shaped recording medium or a disk cartridge, and wherein
   the cover comprises a cover piece installed in a portion located on the upstream side relative to the rotational direction of the disk-shaped recording medium when the information is recorded and/or reproduced,
   the cover piece has a front portion facing the accommodating recessed portion and a side portion facing the upstream relative to the rotational direction of the disk-shaped recording medium, and is disposed such that the cover piece is movable between a retracted position where the front portion retracts in contact with an end surface of the disc cartridge accommodated in the tray and a projected position where the front portion faces the outer circumference of the disk-shaped recording medium accommodated in the tray, and that the cover piece is urged to be located in the projected position,
   the front portion has a height in the direction of the thickness of the disk-shaped recording medium accommodated in the accommodating recessed portion and a length in the circumferential direction of the disk-shaped recording medium, and
   the side portion has an airflow guiding passage for guiding an airflow, which is generated when the disk-shaped recording medium is rotated, away from the pickup.

4. The disk drive unit according to claim 3, wherein the cover piece comprises a first film member mounting portion provided on an upper end of the front portion at a downstream end relative to the rotational direction when the information is recorded and/or reproduced, the first film member mounting portion has a height smaller than the height of the front portion, and extends from the upper end of the front portion at the downstream end in the circumferential direction of the disk-shaped recording medium accommodated in the tray, further comprising:
   a first film member having a height in the direction of the thickness of the disk-shaped recording medium accommodated in the tray and a length in the circumferential direction of the disk-shaped recording medium is attached to the first film member mounting portion, the first film member having a rigidity avoiding a flexing by an airflow generated when the disk-shaped recording medium rotates, the first film member providing a surface that continues to the front portion.

5. The disk drive unit according to claim 4, wherein the cover piece comprises a second film member mounting portion provided at a location farther outward in the radial direction of the disk-shaped recording medium accommodated in the tray than the first film member mounting portion of the front portion, further comprising:
   a second film member having a height in the direction of the thickness of the disk-shaped recording medium accommodated in the tray and a length in the circumferential direction of the disk-shaped recording medium is attached to the second film member mounting portion, the second film member having a rigidity avoiding a flexing by an airflow generated when the disk-shaped recording medium rotates, the second film member being provided such that it is spaced away from the first film member on the upstream side relative to the rotational direction, while it is close to the first film member on the downstream side relative to the rotational direction.

6. The disk drive unit according to claim 1, wherein the pickup includes a first pickup and a second pickup that have different retreated positions, the cutout includes a first cutout for the first pickup and a second cutout for the second pickup, and the cover is configured to cover a part of at least one of the first cutout and the second cutout and the top of at least one of the first pickup and the second pickup that are in the respective retreated positions.

7. The disk drive unit according to claim 6, wherein a first retreated position of the first pickup is apart from the driving means in the direction toward the projected position from the retracted position, a second retreated position of the second pickup is apart from the rotative driving means in the direction toward the retracted position from the projected position, the first pickup and the second pickup have a travel trajectories passing the same straight line in the direction in which the tray travels, the first cutout and the second cutout linearly and continuously extend, and the cover is configured to cover the part of the second cutout and the top of the second pickup in the second retreated position.

* * * * *